(12) United States Patent
Karc et al.

(10) Patent No.: US 10,143,068 B2
(45) Date of Patent: *Nov. 27, 2018

(54) CONTROLLING LIGHT INTENSITY AT A LOCATION

(71) Applicant: Lutron Electronics Co., Inc., Coopersburg, PA (US)

(72) Inventors: Jeffrey Karc, Danielsville, PA (US); James P. Steiner, Royersford, PA (US); William Bryce Fricke, Bethlehem, PA (US)

(73) Assignee: LUTRON ELECTRONICS CO., INC., Coopersburg, PA (US)

(*) Notice: Subject to any disclaimer, the term of this patent is extended or adjusted under 35 U.S.C. 154(b) by 142 days.

This patent is subject to a terminal disclaimer.

(21) Appl. No.: 15/168,862

(22) Filed: May 31, 2016

(65) Prior Publication Data

US 2016/0278188 A1  Sep. 22, 2016

Related U.S. Application Data

(63) Continuation of application No. 14/574,436, filed on Dec. 18, 2014, now Pat. No. 9,386,669.

(Continued)

(51) Int. Cl.
*H05B 37/02* (2006.01)
*E06B 9/24* (2006.01)
(Continued)

(52) U.S. Cl.
CPC ........... *H05B 37/0272* (2013.01); *E06B 9/24* (2013.01); *G05B 13/024* (2013.01); *G05F 1/66* (2013.01);
(Continued)

(58) Field of Classification Search
None
See application file for complete search history.

(56) References Cited

U.S. PATENT DOCUMENTS 5,248,919 A  9/1993  Hanna et al.
6,084,231 A  7/2000  Popat
(Continued)

FOREIGN PATENT DOCUMENTS

WO  WO/2003/043385  5/2003

*Primary Examiner* — Jany Richardson
(74) *Attorney, Agent, or Firm* — Condo Roccia Koptiw LLP

(57) ABSTRACT

A mobile device that is configured for wireless communication may be configured to operate as a remote control device in a lighting control system, controlling one or more lighting control devices of the lighting control system. The remote control device may control the light intensity in a space, for instance at a location of the remote control device, in response to an ambient light intensity measured at the remote control device. The remote control device may define a user interface for receiving an input that indicates a desired light intensity at the location. The remote control device may measure the ambient light intensity at the location via a light detector, compare the measured ambient light intensity to the desired light intensity, and cause the one or more lighting control devices to adjust the ambient light intensity at the remote control device until it agrees with the desired light intensity.

35 Claims, 5 Drawing Sheets

Related U.S. Application Data

(60) Provisional application No. 61/920,787, filed on Dec. 26, 2013.

(51) Int. Cl.
 *G05B 13/02* (2006.01)
 *G05F 1/66* (2006.01)

(52) U.S. Cl.
 CPC ........ *H05B 37/0218* (2013.01); *Y02A 30/257* (2018.01); *Y02B 20/46* (2013.01); *Y02B 80/50* (2013.01)

(56) References Cited

U.S. PATENT DOCUMENTS

| | | | |
|---|---|---|---|
| 6,583,573 B2 | 6/2003 | Bierman | |
| 7,045,968 B1 | 5/2006 | Bierman et al. | |
| 7,608,807 B2 | 10/2009 | Hick et al. | |
| 7,825,891 B2 | 11/2010 | Yao et al. | |
| 7,884,727 B2 | 2/2011 | Tran | |
| 8,031,164 B2 | 10/2011 | Herz et al. | |
| 8,194,031 B2 | 6/2012 | Yao et al. | |
| 8,410,706 B2 | 4/2013 | Steiner et al. | |
| 8,451,116 B2 | 5/2013 | Steiner et al. | |
| 8,577,392 B1 | 11/2013 | Pai et al. | |
| 8,698,727 B2 | 4/2014 | Herz et al. | |
| 8,723,447 B2 | 5/2014 | Steiner | |
| 8,760,293 B2 | 6/2014 | Steiner | |
| 8,912,905 B2 | 12/2014 | Wong et al. | |
| 9,071,453 B2 | 6/2015 | Shoemaker et al. | |
| 9,115,537 B2 | 8/2015 | Blair | |
| 9,237,620 B1 | 1/2016 | Knapp et al. | |
| 9,386,668 B2 | 7/2016 | Knapp et al. | |
| 9,413,171 B2 | 8/2016 | Neyhart | |
| 9,578,724 B1 | 2/2017 | Knapp et al. | |
| 9,651,632 B1 | 5/2017 | Knapp et al. | |
| 2006/0091822 A1 | 5/2006 | Bierman et al. | |
| 2009/0206983 A1 | 8/2009 | Knode et al. | |
| 2011/0035061 A1* | 2/2011 | Altonen | E06B 9/68 700/278 |
| 2012/0001567 A1 | 1/2012 | Knapp et al. | |
| 2012/0261078 A1 | 10/2012 | Adams et al. | |
| 2012/0286940 A1 | 11/2012 | Carmen, Jr. et al. | |
| 2012/0313535 A1 | 12/2012 | Bedell et al. | |
| 2013/0030589 A1 | 1/2013 | Pessina et al. | |
| 2013/0113284 A1* | 5/2013 | Altonen | H02J 3/12 307/31 |
| 2014/0106735 A1 | 4/2014 | Jackson et al. | |
| 2014/0156079 A1 | 6/2014 | Courtney et al. | |
| 2014/0262057 A1 | 9/2014 | Chambers et al. | |
| 2014/0277805 A1 | 9/2014 | Browne, Jr. et al. | |

\* cited by examiner

CONTROLLING LIGHT INTENSITY AT A LOCATION

CROSS-REFERENCE TO RELATED APPLICATIONS

This application claims priority to U.S. patent application Ser. No. 14/574,436, filed Dec. 18, 2014, which claims priority to U.S. provisional patent application No. 61/920,787, filed Dec. 26, 2013, both of which applications are incorporated herein by reference in their respective entireties.

BACKGROUND

Interior spaces, for example, rooms in residential or commercial buildings, are often illuminated by artificial light from one or more lighting loads, such as incandescent or fluorescent lamps, and/or by natural light, such as sunlight shining through one or more windows. The total light intensity in a space may be measured, for instance using one or more daylight sensors, such as photosensors, which may allow for automated adjustment of the light intensity in the space. For example, a load control device may decrease the light intensity of one or more lighting loads as the total light intensity in the space increases, and/or may increase the light intensity of one or more lighting load as the total light intensity in the space decreases. Daylight sensors are typically mounted to a ceiling within a space at a prescribed distance from one or more windows.

It is often desirable to control the light intensity at the location of a user (e.g., on a task surface) to a desired light intensity. However, because daylight sensors are typically mounted on the ceiling, an associated load control device typically applies a gain factor to the light intensity measured by the daylight sensor before attempting to control the light intensity at the location of the user to the desired light intensity.

Typically, a daylight sensor and an associated load control device must be calibrated before operation, in order to establish an appropriate gain factor to ensure proper operation of the system. Such calibration may be undesirably complicated and burdensome to the average user of a load control system. Additionally, if such calibration is not performed correctly, the system may not operate properly, which may result in a user's inability to accurately control the light intensity at the user's location to a desired light intensity. Examples of calibration methods for daylight sensors are described in greater detail in commonly-assigned U.S. Pat. No. 8,410,706, issued Apr. 2, 2013, entitled "Method Of Calibrating A Daylight Sensor," the entire disclosure of which is incorporated herein by reference.

SUMMARY

As described herein, a remote control device may be configured to adjust the ambient light intensity in a space, for example at the remote control device. The remote control device may be configured for wireless communication. The remote control device may be, for example, a smart phone, a tablet device, a dedicated remote control device, or the like. The remote control device may be associated with a lighting control system, and may be configured to control one or more lighting control devices of the lighting control system. For example, the remote control device may be configured to transmit control messages to the one or more lighting control devices, for instance via wireless communication.

The remote control device may be configured to measure the intensity of ambient light at the remote control device. For example, the remote control device may include a light detector. The remote control device may be configured to determine if an obstruction is blocking the light detector.

The remote control device may define a user interface that is configured to receive inputs, for instance from a user of the remote control device. The user interface may include one or more components that are configured to receive the user inputs. For example, the user interface may include one or more of a touch display that may be configured to exhibit one or more graphical representations of controls, a microphone that may operate as a component of a voice recognition interface, and one or more mechanical controls that are configured to receive manual inputs.

The user input may indicate, for example, a lighting preset selected by the user. The lighting preset may be associated with a desired light intensity. Upon receipt of the user input, the remote control device may actuate to adjust the ambient light intensity at the remote control device until it agrees with the desired light intensity of the lighting preset.

In order to adjust the ambient light intensity at the remote control device, the remote control device may be configured to cause the light detector to measure the ambient light intensity at the remote control device. The remote control device may compare the measured ambient light intensity with the desired light intensity. If the measured ambient light intensity does not agree with the desired light intensity, the remote control device may operate to adjust the ambient light intensity until the measured ambient light intensity agrees with the desired light intensity, for example by transmitting respective control messages to the one or more lighting control devices of the lighting control system.

The remote control device may be configured to address the control messages to the one or more lighting control devices in accordance with the lighting preset. If no lighting control devices are specified for the lighting preset, the remote control device may be configured to determine one or more lighting control devices to control in order to adjust the ambient light intensity, for example based on the location of the remote control device. The remote control device may be configured to adjust the ambient light intensity at the remote control device incrementally, until the measured ambient light intensity agrees with the desired light intensity.

The remote control device may be configured to learn, and may adjust its operation, in accordance with how the associated lighting control system is controlled by one or more users of the remote control device. The remote control device may be configured to adjust the ambient light intensity at the remote control device in accordance with a hierarchy of lighting control devices of the associated lighting control system.

The remote control device may be configured to, once the ambient light intensity at the remote control device agrees with the desired light intensity, maintain the ambient light intensity at the remote control device in accordance with the desired light intensity, for instance until a different lighting preset is selected or until a currently selected lighting preset is unselected. The remote control device may be configured to allow a lighting preset to follow a user, for instance if a user moves the remote control device from one location to another within a space.

The remote control device may be configured to control one or more lighting control devices of the associated lighting control system to adjust the ambient light intensity at the remote control device based on respective measurements of natural light and artificial light at the remote control device. The remote control device may be configured to control one or more lighting control devices of the associated lighting control system to adjust the ambient light intensity at the remote control device, based on a user configured preference for natural lighting over artificial lighting or for artificial lighting over natural lighting.

DETAILED DESCRIPTION

Figure 1:
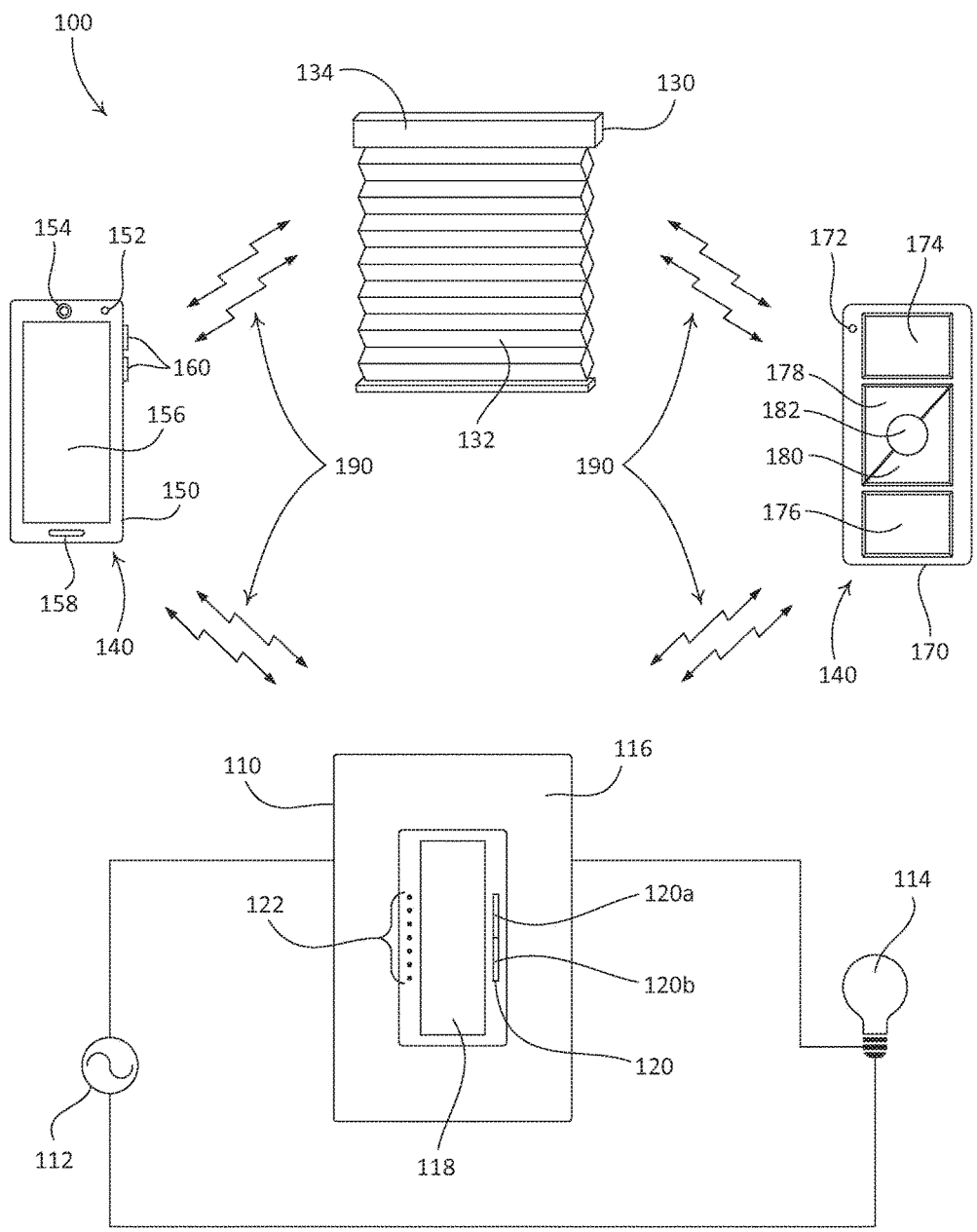
FIG. 1 is a simplified diagram depicting an example lighting control system that includes a first lighting control device, a second lighting control device, and two remote control devices that include respective light detectors.

FIG. 1 depicts an example lighting control system 100 that may be configured to control the light intensity in a space, for example at a location within a space. The lighting control system 100 may be operated to control one or both of the amount of artificial light in the space and the amount of natural light in the space. The artificial light in the space may include light generated by light sources that are interior with respect to the space, for example light generated by one or more artificial light sources located in the space. Artificial light sources may include, for example, incandescent light bulbs, light emitting diode (LED) light engines, or the like that are mounted in respective light fixtures (e.g., ceiling-mounted light fixtures, recessed pot lights, wall sconces, screw-in lamps, etc.). The natural light in the space may include light that enters the space from one or more sources that are exterior to the space, such as sunlight, moonlight, and/or light from one or more artificial light sources (e.g., street lights, exterior home lighting, etc.). In this regard, natural light may include light from one or more sources of artificial light. The artificial light generated within the space and the natural light that enters the space may, in combination, define an ambient lighting in the space.

The lighting control system 100 may include one or more lighting control devices. As shown, the lighting control system 100 includes a dimmer switch 110 (e.g., a load control device) that is configured to control one or more lighting loads (e.g., sources of artificial light), and a motorized window treatment 130 that is configured to control an amount of natural light that passes through an opening (e.g., a window, a doorway, or the like). In accordance with the illustrated lighting control system 100, the dimmer switch 110 may be referred to as a first lighting control device of the lighting control system 100, and the motorized window treatment 130 may be referred to as a second lighting control device of the lighting control system 100.

As shown, the illustrated dimmer switch 110 may be coupled in series electrical connection between a power source (e.g., an alternating-current (AC) power source 112) and an electrical load, for example a lighting load 114, for controlling the amount of power delivered to the lighting load 114, and thus the intensity of the lighting load 114. The illustrated dimmer switch 110 may be configured to be wall mounted in a standard electrical wallbox. Alternatively, the dimmer switch 110 may be implemented as a table top load control device (not shown). It should be appreciated that the power source is not limited to an AC power source. For example, the power source may alternatively be a direct-current (DC) power source.

As shown, the dimmer switch 110 includes a faceplate 116, a toggle actuator 118 (e.g., a button), and an intensity adjustment actuator 120 (e.g., a rocker switch). Successive actuations of the toggle actuator 118 may toggle, for example turn off and on, the lighting load 114. The intensity adjustment actuator 120 may define respective upper and lower portions 120a, 120b, that are operable independently of each other. Actuations of the upper portion 120a or the lower portion 120b of the intensity adjustment actuator 120 may respectively increase or decrease the amount of power delivered to the lighting load 114, and thus increase or decrease the intensity of the lighting load 114 from a minimum intensity (e.g., approximately 1%) to a maximum intensity (e.g., approximately 100%). The dimmer switch 110 may further include a wireless communication circuit (not shown). The wireless communication circuit may comprise, for example, a receiver (e.g., an RF receiver) and an antenna that is mounted within the dimmer switch 110. The wireless communication circuit may be configured to receive RF signals 190, for example. The dimmer switch 110 may further include a plurality of visual indicators 122 (e.g., LEDs) that are arranged in a linear array and may be configured to illuminate to provide feedback of the intensity of the lighting load 114. An example of a dimmer switch having a toggle actuator and an intensity adjustment actuator is described in greater detail in U.S. Pat. No. 5,248,919, issued Sep. 29, 1993, entitled "Lighting Control Device," the entire disclosure of which is incorporated herein by reference.

The dimmer switch 110 may be configured to be controlled locally, for example via the toggle actuator 118 and/or the intensity adjustment actuator 120. The dimmer switch 110 may further be configured to be controlled remotely, for example via one or more wireless signals, such as radio-frequency (RF) signals 190 received at the wireless communication circuit of the dimmer switch 110. Wireless signals, such as RF signals 190, may be transmitted to the dimmer switch 110 from a control device (e.g., a remote control device), for example directly via a wireless communication link. Such a wireless communication link may use a proprietary protocol (e.g., the ClearConnect® protocol), a standard protocol (e.g., an 802.11 wireless local area network (LAN) such as a WiFi communication link, a Wi MAX communications link, a Zigbee communication link, a Bluetooth® communication link, a near field communication (NFC) link, a cellular communications link, a television white space (TVWS) communication link), or any combination thereof. Examples of dimmer switches operable to transmit and receive such signals (e.g., digital messages) is described in greater detail in U.S. patent application Ser. No. 12/033,223, filed Feb. 19, 2008, entitled "Communication Protocol For A Radio Frequency Load Control System," the entire disclosure of which is incorporated herein by reference.

The illustrated motorized window treatment 130 includes a covering material 132 that is configured to hang in front of an opening, such as a window. As shown, the covering material 132 is a cellular shade. It should be appreciated, however, that the covering material 132 is not limited to a cellular shade. For example, the covering material 132 may alternatively be, for example, a roller shade, a drapery, a Roman shade, a Venetian blind, a Persian blind, a pleated blind, a tensioned roller shade, or any other suitable covering material. The motorized window treatment 130 further includes a motor drive unit 134 that is configured to adjust a position of the covering material 132 relative to the opening, so as to control an amount of natural light that passes through the opening. For example, the motor dive unit 134 may be configured to move the covering material 132 vertically between opened and closed positions relative to the opening.

The motorized window treatment 130 may be configured to be controlled remotely, for example via one or more wireless signals, such as RF signals 190 received at the motorized window treatment 130. The motor drive unit 134 of the motorized window treatment 130 may include a wireless communication circuit (not shown). The wireless communication circuit may comprise, for example, a receiver (e.g., an RF receiver) and an antenna that is mounted to, or that extends from, the motor drive unit 134. The wireless communication circuit may be configured to receive RF signals 190, for example. Wireless signals, such as RF signals 190, may be transmitted to the motorized window treatment 130 from a control device (e.g., a remote control device), for example directly via a wireless communication link. Such a wireless communication link may use a proprietary protocol (e.g., the ClearConnect® protocol), a standard protocol (e.g., an 802.11 wireless local area network (LAN) such as a WiFi communication link, a Wi MAX communications link, a Zigbee communication link, a Bluetooth® communication link, a near field communication (NFC) link, a cellular communications link, a television white space (TVWS) communication link), or any combination thereof. The motor drive unit 134 of the motorized window treatment 130 may be battery powered and/or may receive power from an external direct-current (DC) power supply. Examples of battery-powered motorized window treatments are described in greater detail in commonly-assigned U.S. patent application publication no. 2012/0261078, published Oct. 18, 2012, entitled "Motorized Window Treatment," and in U.S. patent application Ser. No. 13/798,946, filed Mar. 13, 2013, entitled "Battery-Powered Roller Shade System," the entire disclosures of which are incorporated herein by reference.

It should be appreciated that the lighting control system 100 may include multiple motorized window treatments installed relative to a particular opening. For example, a first motorized window treatment (e.g., the motorized window treatment 130) may be installed in or near an opening (e.g., a window). The first motorized window treatment may include a covering material (e.g., an adjustable sheer shade) that is configured to partially block natural light that enters a space through the opening. The lighting control system 100 may further include a second motorized window treatment (not shown) that is installed in or near the opening, for instance adjacent to (e.g., behind) the first motorized window treatment. The second motorized window treatment may include a covering material (e.g., a black out shade) that is configured to block substantially all natural light that enters the space through the opening. The lighting control system 100 may be configured such that the first and second motorized window treatments may be operated individually or in tandem (e.g., via positioning of the respective covering materials) to control an amount of natural light that enters the space through the opening. For example, both the first and second motorized window treatments may be configured to be controlled remotely, for example by an associated remote control device via one or more wireless signals (e.g., RF signals 190) received at the first and second motorized window treatments.

The lighting control system 100 may include one or more remote control devices 140 that are configured to control (e.g., associated with) the lighting control devices of the lighting control system 100, in order to adjust and/or control the ambient lighting (e.g., the light intensity) in a space. The remote control devices 140 may be portable (e.g., freely moveable relative to a space, such as a fixed space, where the lighting control system 100 is located), and may be configured to control one or more lighting control devices of the lighting control system 100, for example by via transmitting one or more messages (e.g., digital messages) via wireless signals, such as RF signals 190. One or more remote control devices 140 of the lighting control system 100 may be configured to be mounted to a wall and/or may be configured to be supported on a pedestal (e.g., a tabletop mounted pedestal).

The one or more remote control devices 140 may be configured to transmit wireless signals (e.g., signals that include messages) directly to one or more lighting control devices, for example via a wireless communication link. Such a wireless communication link may use a proprietary protocol (e.g., the ClearConnect® protocol), a standard protocol (e.g., an 802.11 wireless local area network (LAN) such as a WiFi communication link, a Wi MAX communications link, a Zigbee communication link, a Bluetooth® communication link, a near field communication (NFC) link, a cellular communications link, a television white space (TVWS) communication link), or any combination thereof. The lighting control system 100 may include a wireless router (not shown) that may be configured to facilitate the configuration and/or operation of the lighting control system 100 (e.g., the transmission of messages between the one or more remote control devices 140 and the lighting control devices), and to provide a connection to the Internet. Examples of load control systems having WiFi-enabled devices, such as smart phones and tablet devices, are described in greater detail in commonly-assigned U.S. patent application publication no. 2013/0030589, published Jan. 31, 2013, entitled "Load Control Device Having Internet Connectivity," and U.S. patent application Ser. No. 13/796,486, filed Mar. 12, 2013, entitled "Network Access Coordination Of Load Control Devices," the entire disclosures of which are incorporated herein by reference.

The messages may include respective commands that cause one or more lighting control devices of the lighting control system 100 to adjust the intensity of the ambient light in a space, for example the intensity of ambient light near the remote control device 140 that originated the messages. To illustrate, one or more messages transmitted by a remote control device 140 may include a command that causes the dimmer switch 110 to adjust an intensity of an associated lighting load (e.g., the lighting load 114) that is controlled by the dimmer switch 110, and/or may include a command that causes the motorized window treatment 130 to adjust the position of the covering material 132. In this regard, a remote control device 140 may transmit one or more messages that include commands that adjust the intensity of artificial light that arrives at the remote control device 140, and/or that adjust the amount of natural light that arrives at the remote control device 140. A remote control device 140 may be configured to download a product control application that may allow the remote control device 140 to control one or more lighting control devices of the lighting control system 100 (e.g., the dimmer switch 110 and/or the motorized window treatment 130).

The remote control devices 140 may be referred to as mobile control devices of the lighting control system 100. As shown, the lighting control system 100 has two remote control devices 140, including a wireless communication device 150 that is configured to operate as a remote control device 140 for the lighting control system 100, and a dedicated remote control device 170 that is configured to operate as a remote control device 140 to control the lighting control system 100.

The wireless communication device 150 may include one or more sensors that are capable of detecting light, and that may be operated to measure a light intensity at the wireless communication device 150. For example, as shown, the wireless communication device 150 includes a light detector 152 (e.g., a photosensitive diode) and a camera 154 (e.g., a forward facing camera located on a surface near a display of the wireless communication device 150). The wireless communication device 150 may define a user interface. The user interface may include one or more components that are configured to receive inputs, such as user inputs received from a user of the wireless communication device 150. As shown, the wireless communication device 150 may define a user interface that includes a visual display, such as a capacitive or resistive touch display 156, that may be configured to exhibit (e.g., display) one or more graphical representations of controls (e.g., soft buttons), a microphone 158 that may operate as a component of a voice recognition interface, and one or more mechanical controls (e.g., physical buttons 160) that are configured to receive manual inputs (e.g., via button presses). It should be appreciated that the wireless communication device 150 is not limited to the illustrated user interface. For example, the user interface of the wireless communication device 150 may alternatively include any combination of one or more displays (e.g., touch display 156), audio receivers (e.g., microphone 158), mechanical controls (e.g., buttons 160), or the like.

As shown, the wireless communication device 150 is implemented as a smart phone (e.g., an iPhone® smart phone, an Android® smart phone, or a Blackberry® smart phone). However, the wireless communication device 150 may alternatively be implemented as any device that is capable of configuration for wireless communication with the lighting control devices of the lighting control system 100. For example, the wireless communication device 150 may be implemented as any Internet Protocol (IP) enabled device, a personal computer such as a laptop, a tablet device (e.g., an iPad® hand-held computing device), a wearable device (e.g., Google Glass™ eyewear, a Fitbit® wristband, an iWatch® timepiece, etc.), a media device that is configured for wireless communication (e.g., an MP3 player, a gaming device, an audio receiver, or a DVD™ player, a Blu-Ray™ player, a display monitor such as an HDTV), a dedicated remote control device of a media device, a universal or programmable remote control, or the like. The wireless communication device 150 may be operable to transmit wireless signals, such as RF signals 190, to one or more lighting control devices of the lighting control system 100, such as the dimmer switch 110 or the motorized window treatment 130. The signals may include one or more messages (e.g., messages that include lighting control device commands).

The remote control device 170 may include one or more sensors that are capable of detecting an ambient light level. For example, as shown, the remote control device 170 includes a light detector 172 (e.g., a photosensitive diode) that may be operated to measure a light intensity at the remote control device 170. The remote control device 170 may define a user interface. The user interface may include one or more components that are configured to receive inputs, such as inputs received from a user of the remote control device 170. As shown, the remote control device 170 may define a user interface that includes one or more mechanical controls (e.g., physical buttons) that are configured to receive manual inputs (e.g., via button presses). The illustrated remote control device 170 includes an on button 174, an off button 176, a raise button 178, a lower button 180, and a preset button 182. It should be appreciated that the remote control device 170 is not limited to the illustrated user interface. For example, the user interface of the remote control device 170 may alternatively include any combination of one or more displays, audio receivers, mechanical controls, or the like. The remote control device 170 may be battery-powered, or may be powered by an external power source (e.g., a direct-current (DC) power supply). The remote control device 170 may be configured to be mounted to a wall and/or may be configured to be supported on a pedestal (e.g., a tabletop mounted pedestal).

The remote control device 170 may be associated with one or more lighting control devices of the lighting control system 100, such that the remote control device 170 may be operated to control the one or more lighting control devices. For example, the remote control device 170 may be associated with the dimmer switch 110, and may be configured to transmit messages via wireless signals (e.g., RF signals 190) for controlling an electrical load (e.g., the lighting load 114) in response to activations of the buttons 174-182. To illustrate, the remote control device 170 may transmit one or more commands (e.g., via messages) that cause the dimmer switch 110 to turn the lighting load 114 on or off in response to operation of the on button 174 or the off button 176, respectively. The remote control device 170 may transmit one or more commands that cause the dimmer switch 110 to raise or lower the intensity of the lighting load 114 in response to operation of the raise button 178 or the lower button 180, respectively. Examples of remote control devices having a plurality of buttons are described in greater detail in commonly-assigned U.S. patent application publication no. 2012/0286940, published Nov. 12, 2012, entitled "Control Device Having A Nightlight," the entire disclosure of which is incorporated herein by reference.

The remote control device 170 may be associated with the motorized window treatment 130, for example in addition to or in place of being associated with the dimmer switch 110. The remote control device 170 may be configured to transmit messages via wireless signals (e.g., RF signals 190) for controlling a position of the covering material 132 in response to activations of the buttons 174-182. To illustrate, the remote control device 170 may be configured to transmit one or more commands (e.g., via messages) that cause the motorized window treatment 130 to raise or lower the covering material 132 in response to operation of the raise button 178 or the lower button 180, respectively.

It should be appreciated that the lighting control system 100 is not limited to the illustrated remote control devices 140 (e.g., the wireless communication device 150 and the remote control device 170). For example, the lighting control system 100 may include remote control devices 140 other than the wireless communication device 150 and the remote control device 170, a single remote control device 140, or more than two remote control devices 140.

In accordance with an example of operation of the lighting control system 100, a user may enter a space in which the lighting control system 100 is installed. The user may activate a control on the wireless communication device 150. The control may be associated with the selection of a predetermined light intensity that the user desires for the space (e.g., associated with a reading preset). The wireless communication device 150 may measure a light intensity at the wireless communication device 150, for example using the light detector 152. The wireless communication device 150 may compare the measured light intensity with the light intensity that is associated with the reading preset. If the measured light intensity does not match (e.g., within a threshold) the light intensity of the reading preset, the wireless communication device 150 may transmit one or more messages (e.g., via RF signals 190) to one or both of the dimmer switch 110 and the motorized window treatment 130. The one or more messages may include commands that cause the dimmer switch 110 to adjust the intensity of the lighting load 114, and/or that cause the motorized window treatment 130 to adjust the position of the covering material 132, such that the light intensity at the wireless communication device 150 matches the light intensity that is associated with the reading preset.

It should be appreciated that the reading preset may also be activated using the remote control device 170, for example rather than activating the reading preset via the wireless communication device 150. For example, upon selection of the reading preset, the remote control device 170 may measure a light intensity at the remote control device 170, for example using the light detector 172. The remote control device 170 may compare the measured light intensity with the light intensity that is associated with the reading preset. If the measured light intensity does not match (e.g., within a threshold) the light intensity of the reading preset, the remote control device 170 may transmit one or more messages (e.g., via RF signals 190) to one or both of the dimmer switch 110 and the motorized window treatment 130. The one or more messages may include commands that cause the dimmer switch 110 to adjust the intensity of the lighting load 114, and/or that cause the motorized window treatment 130 to adjust the position of the covering material 132, such that the light intensity at the remote control device 170 matches the light intensity that is associated with the reading preset.

Figure 2:
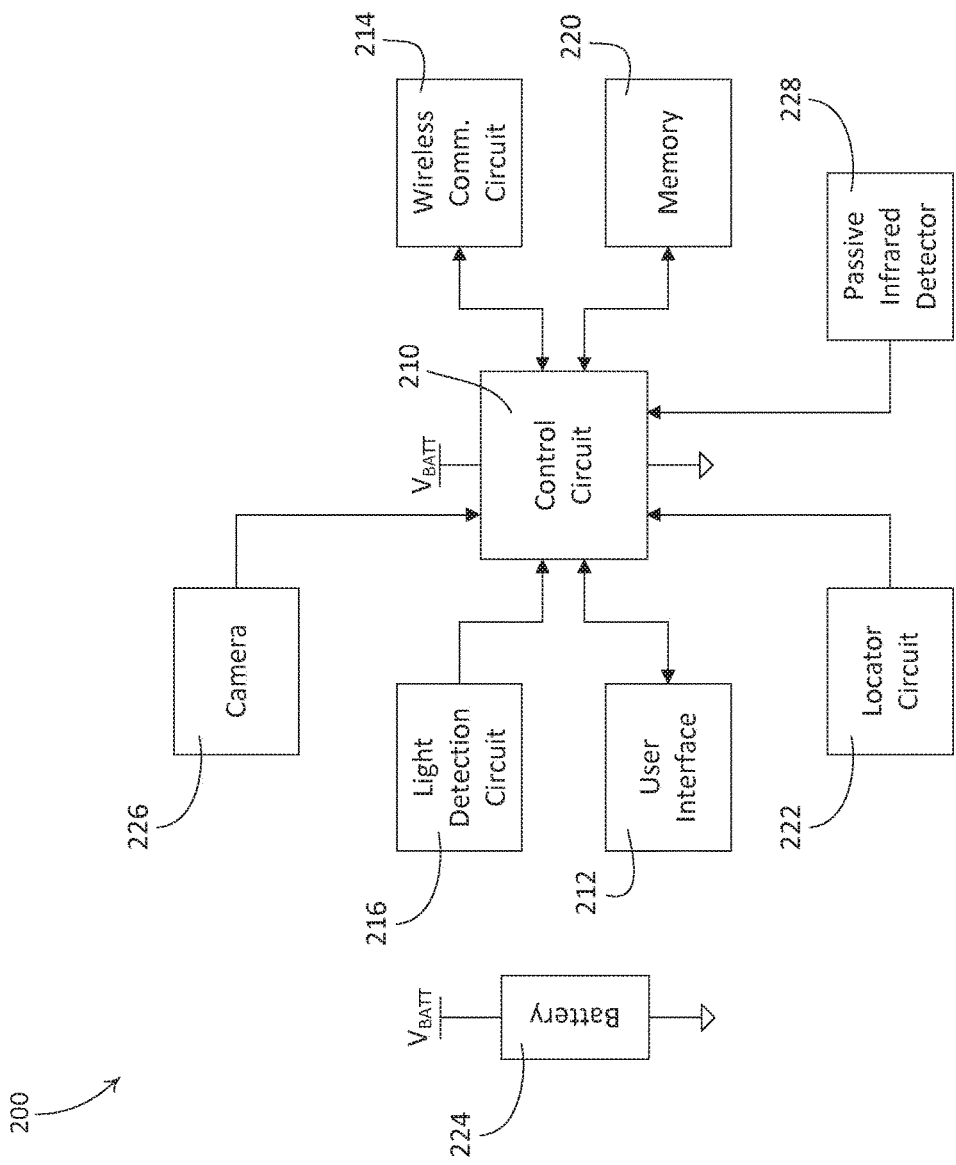
FIG. 2 is a simplified block diagram of an example remote control device.

FIG. 2 is a simplified block diagram of an example remote control device 200 that may be implemented as, for example, the wireless communication device 150 and/or the remote control device 170 of the lighting control system 100 shown in FIG. 1. For example, the remote control device 200 may be implemented as one of the remote control devices 140 (e.g., the wireless communication device 150 or the remote control device 170) of the lighting control system 100 shown in FIG. 1, to control the dimmer switch 110 and/or the motorized window treatment 130 to adjust the ambient light intensity in a space (e.g., at the remote control device 200). The remote control device 200 may be configured to control one or more lighting control devices of a lighting control system, such as the dimmer switch 110 and/or the motorized window treatment 130 of the lighting control system 100.

As shown, the remote control device 200 may include a control circuit 210. The control circuit 210 may include one or more of a processor (e.g., a microprocessor), a microcontroller, a programmable logic device (PLD), a field programmable gate array (FPGA), an application specific integrated circuit (ASIC), or any suitable processing device.

The remote control device 200 may further include a user interface 212. The user interface 212 may be communicatively coupled to the control circuit 210, for example such that receipt of an input (e.g., a user input) at the user interface 212 may cause the control circuit to actuate, for instance to control one or more lighting control devices of an associated lighting control system (e.g., the lighting control system 100). The user interface 212 may include, for example, one or more displays, audio receivers, mechanical controls, or the like (e.g., the touch display 156, microphone 158, and buttons 160 of the wireless communication device 150, and/or the buttons 174-182 of the remote control device 170. If the user interface 212 comprises a capacitive or resistive touch display, the control circuit 210 may cause one or more graphical representations of controls (e.g., soft buttons) and/or other information related to an associated lighting control system (e.g., the lighting control system 100) to be exhibited on the touch display.

The remote control device 200 may further include a wireless communication circuit 214. The wireless communication circuit 214 may include a transmitter coupled to an antenna for transmitting signals (e.g., an RF transmitter that is configured to transmit RF signals 190). Alternatively, the wireless communication circuit 214 may include an RF receiver for receiving RF signals, an RF transceiver for transmitting and receiving RF signals, or an infrared (IR) transmitter and/or receiver for transmitting and/or receiving IR signals. The control circuit 210 may be communicatively coupled to the wireless communication circuit 214, for example such that the control circuit 210 may cause the wireless communication circuit 214 to transmit one or more messages via RF signals.

The remote control device 200 may further include a light detection circuit 216. The light detection circuit 216 may comprise, for example, a light detector (not shown). The light detector may comprise a photosensitive circuit including, for example, a photosensitive diode configured to measure an intensity of light (e.g., ambient light) at the remote control device 200. The light detection circuit 216 may be communicatively coupled to the control circuit 210, for example such that the control circuit 210 may cause the light detection circuit 216 to make one or more measurements of an intensity of light at the remote control device 200. Alternatively, the light detection circuit 216 may be integral with the control circuit 210 (e.g., integrated within a microchip).

The remote control device 200 may further include a memory 220. The memory 220 may be communicatively coupled to the control circuit 210, and may operate to store information such as one or more lighting presets and/or one or more associated preset light intensities, and/or computer-executable instructions (e.g., a product control application that may be executed by the control circuit 210). The control circuit 210 may be configured to store and/or retrieve such information from the memory 220. The memory 220 may include any component suitable for storing such information. For example, the memory 220 may include one or more components of volatile and/or non-volatile memory, in any combination. The memory 220 may be internal and/or external with respect to the control circuit 210. For example, the memory 220 may be implemented as an external integrated circuit (IC), or as an internal circuit of the control circuit 210 (e.g., integrated within a microchip).

The remote control device 200 may optionally include a locator circuit 222. The locator circuit 222 may be configured to determine a location of the remote control device 200. For example, the locator circuit 222 may be configured determine a location of the remote control device 200 within a space, may be configured to determine a proximity of the remote control device 200 relative to one or more sources of artificial and/or natural light, or the like. The locator circuit 222 may be communicatively coupled to the control circuit 210, for example such that the control circuit 210 may cause the locator circuit 222 to make one or more location determinations that pertain to the remote control device 200. The locator circuit 222 may include, for example, a global positioning system (GPS) receiver or the like.

The control circuit 210 may be configured to determine the location of the remote control device 200 in an alternative manner, for example in addition to or in lieu of using the locator circuit 222 (e.g., in a configuration where the locator circuit 222 is omitted from the remote control device 200). For example, the control circuit 210 may be configured to employ the wireless communication circuit 214 to determine the location of the remote control device 200 (e.g., using respective received signal strengths from one or more wireless devices having known locations), may be configured to employ the light detector of the light detection circuit 216 to receive one or more messages via visible light communication (VLC) from one or more lighting fixtures in a space where the remote control device 200 is located, or may be configured to employ other suitable localization techniques, in any combination.

The remote control device 200 may further include a battery 224 that produces a battery voltage $V_{BATT}$ for powering the control circuit 210, the wireless communication circuit 214, the light detection circuit 216, the memory 220, the locator circuit 222, and/or other low voltage circuitry of the remote control device 200. The remote control device 200 may be further configured to derive power from one or more alternative sources, for example from one or more photovoltaic cells (e.g., solar cells) that are electrically connected to the remote control device 200, and/or a DC power supply (e.g., that is plugged into an AC outlet) to which the remote control device 200 may be wired. Such alternative sources of power may supplement, or may replace, the derivation of power from the battery 224.

It should be appreciated that the remote control device 200 is not limited to the illustrated components. It should further be appreciated that the components of the illustrated components may be implemented in any combination of hardware and/or software. For example, the remote control device 200 may be implemented with dedicated circuitry that corresponds to the illustrated components. In another example, the remote control device 200 (e.g., including the illustrated components) may be implemented as a software program (e.g., an app) on a multi-purpose electronic device such as a smart phone or other device), or the like.

In an example of operation of the remote control device 200, an input may be received at the user interface 212 (e.g., an activation of a soft button exhibited on the touch display 156, a voice command received at the microphone 158, or the operation of one or more of the buttons 160 of the wireless communication device 150, or may include the operation of one or more of the buttons 174-182 of the remote control device 170). The input may be indicative of a lighting preset (e.g., indicative of a user selection of a desired lighting preset and/or a desired light intensity), for example.

The control circuit 210 may be configured to, in response to receipt of the input, cause the light detection circuit 216 to perform a measurement of an intensity of ambient light at the remote control device 200. The light detection circuit 216 may be configured to measure the light intensity at the remote control device 200 using the light detector (e.g., the light detector 152 of the wireless communication device 150 or the light detector 172 of the remote control device 170), for example by sampling the output of the light detector. Examples of circuits for measuring the light intensity in a space are described in greater detail in commonly-assigned U.S. Pat. No. 8,451,116, issued May 28, 2013, entitled "Wireless Battery Powered Daylight Sensor," the entire disclosure of which is incorporated herein by reference.

The light detection circuit 216 may further be configured to measure the light intensity at the remote control device 200 using a camera, for example in addition to or in lieu of measuring the light intensity at the remote control device 200 using the light detector. For example, the remote control device 200 may further include a camera (not shown). The control circuit 210 may cause the remote control device 200 to take a picture with the camera, and may determine the measured ambient light intensity at the remote control device 200 using the picture, for example by calculating the luminance of one or more pixels of the picture. The light detection circuit 216 may further be configured to measure the light intensity at the remote control device 200 using a photosensitive circuit, for example in addition to or in lieu of measuring the light intensity at the remote control device 200 using the light detector. For example, the remote control device 200 may further include a photosensitive circuit (not shown). The control circuit 210 may sample an output of the photosensitive circuit. The remote control device 200 may be further configured to be responsive to a light detector that is external to the remote control device 200. For example, an external light detector may be configured to be plugged into an audio headphone jack or a Universal Serial Bus (USB) port on the remote control device 200, so as to communicatively couple the external light detector to the control circuit 210 and/or to provide power to the external light detector. Alternatively, an external light detector may be battery-powered, and operable to communicate with the remote control device 200 via wireless communication, for example using Near Field Communication (NFC), Bluetooth technology, or the like.

The control circuit 210 may be further configured to, in response to receipt of the input, retrieve from the memory 220 information related to the input (e.g., the selected lighting preset). Such information may include, for example, a desired light intensity, an acceptable difference threshold (e.g., variation) between ambient light intensity at the remote control device 200 and the desired light intensity that may be acceptable to a user of the remote control device 200, or the like. One or more lighting presets may be stored in the memory 220. A lighting preset may be associated with a predetermined (e.g., user desired) light intensity at the remote control device 200. To illustrate, a reading preset may be stored in the memory 220, for example by a user. The reading preset may be associated with a particular desired light intensity at the remote control device 200. A user may select the reading preset via the user interface 212 of the remote control device 200, for example by activating a soft button on a display, by speaking a predetermined voice command into a microphone, by pressing a physical button, and/or by providing another input to the user interface 212 that is recognized by the remote control device 200 and that is associated with the reading preset.

One or more lighting presets (e.g., a reading preset) may be configured by a user of the remote control device 200, and stored in the memory 220. For example, a user may operate the remote control device 200 to control one or more lighting control devices of an associated lighting control system (e.g., the lighting control system 100) to adjust the ambient light intensity at the remote control device 200 (e.g., at a location within a space) to a light intensity that is desirable for reading. The user may then activate a save function (e.g., via a soft button) of the remote control device 200 while the remote control device 200 is positioned at a location where the user desires to read. In response to activation of the save function, the control circuit 210 may cause the light detection circuit 216 to measure the ambient light intensity at the remote control device 200 (e.g., using the light detector), and may store the measured ambient light intensity in the memory 220 as a reading preset. Other example lighting presets may include, for example, one or more of a television preset for setting the ambient light intensity to a desired intensity for watching television, and a desk work preset for setting the ambient light intensity to a desired intensity for performing paper work on a task surface.

The remote control device 200 may store a plurality of lighting presets, for example in the memory 220. The plurality of lighting presets may be associated with a particular user, or may be associated with a number of different users. The remote control device 200 may be configured to recognize which user is operating the remote control device 200, and may display particular lighting presets (e.g., on the touch display 156) based on a user that is currently using the remote control device 200. For example, a current user may be authenticated to the remote control device 200 (e.g., via credentials), the remote control device 200 may be configured to perform facial or voice recognition of the current user, the remote control device 200 may be configured to perform biometric recognition of the current user (e.g., via a fingerprint reader), or the like.

The control circuit 210 may be further configured to, upon retrieving the information related to the input, compare the measured ambient light intensity with the desired light intensity indicated by the input, in accordance with the information. The measured ambient light intensity may agree with the desired light intensity, for example, if a difference between the measured ambient light intensity and the desired light intensity falls within the difference threshold. The measured ambient light intensity may disagree with the desired light intensity, for example, if a difference between the measured ambient light intensity and the desired light intensity falls outside the difference threshold.

If the measured ambient light intensity disagrees with the desired light intensity, the control circuit 210 may cause the ambient light intensity at the remote control device 200 to be adjusted in accordance with the desired light intensity. For example, the control circuit 210 may cause the ambient light intensity at the remote control device 200 to be adjusted by transmitting one or more messages, via the wireless communication circuit 214, to one or more lighting control devices of an associated lighting control system. The one or more messages may include respective commands for the one or more lighting control devices to adjust the light intensity at the remote control device 200, such that the light intensity at the remote control device 200 agrees with the desired light intensity that is associated with the lighting preset indicated by the input. Alternatively, the one or more messages may include the measured ambient light intensity, and the one or more lighting control devices may be configured to adjust the ambient light intensity at the remote control device 200 in response to receiving the one or more messages. Alternatively still, the control circuit 210 may transmit one or more messages that include the measured ambient light intensity, via the wireless communication circuit 214, to a gateway device (not shown), such as a bridge device. Such a gateway device may be configured to act as a central controller of an associated lighting control system (e.g., by controlling one or more lighting control devices of the lighting control system), and/or may be configured to relay wireless communication messages between by devices of the lighting control system. In an example configuration, such a central controller may monitor for messages from the remote control device 200. Upon receiving one or more messages from the remote control device 200 that include the measured ambient light intensity, the central controller may generate and transmit commands to respective lighting control devices of the lighting control system. The central controller may be configured to receive one or more messages from the remote control device via a first wireless communication protocol, and may distribute commands to one or more lighting control devices of the lighting control system via one or more different wireless communication protocols.

The remote control device 200 may be configured to address the transmitted messages to one or more lighting control devices in accordance with the lighting preset. For example, a lighting preset may be associated with the adjustment of one or more specific (e.g., user specified) lighting control devices of an associated lighting control system (e.g., the lighting control system 100). For example, a lighting preset may be associated with one or more lighting control devices that are configured to control respective sources of artificial light, may be associated with one or more lighting control devices that are configured to control an amount of natural light that reaches the remote control device 200, or may be associated with a mix of particular lighting control devices that are configured to control respective sources of artificial light and particular lighting control devices that are configured to control an amount of natural light that reaches the remote control device 200. Such lighting control device associations may be specified by a user of the remote control device 200, for example when creating the lighting preset.

The control circuit 210 may be configured to cause the wireless communication circuit 214 to address one or more messages (e.g., including commands) to the one or more lighting control devices specified in the lighting preset. The control circuit 210 may be further configured to cause the wireless communication circuit 214 to broadcast one or more messages comprising commands, for example without addressing respective messages to one or more specific lighting control devices. If one or more lighting control devices that receive such broadcasts are aware of the selected lighting preset (e.g., have the lighting preset stored in memory), those one or more lighting control devices may respond to receipt of the one or more broadcasted messages (e.g., by adjusting respective lighting loads, covering materials, etc. in accordance with the lighting preset).

If no lighting control devices are specified for the lighting preset, the remote control device 200 may be configured to determine one or more lighting control devices to control via the one or more messages, in order to adjust the ambient light intensity at the remote control device 200. For example, the control circuit 210 may cause the locator circuit 222 to determine information related to a current location of the remote control device 200. The remote control device 200 may use the location information to determine one or more sources of artificial and/or natural light that are within a predetermined proximity of the current location of the remote control device 200 and that are controllable by respective lighting control devices of an associated lighting control system (e.g., the lighting control system 100). The control circuit 210 may cause the wireless communication circuit 214 to address one or more messages (e.g., including commands) to one or more lighting control devices that are configured to control sources of artificial and/or natural light that are within the proximity of the current location of the remote control device 200.

The remote control device 200 may be configured to adjust the ambient light intensity at the remote control device 200 incrementally, until the measured ambient light intensity agrees with the desired light intensity. For example, the control circuit 210 may be configured to, upon determining that the measured ambient light intensity at the remote control device 200 does not agree with the desired light intensity, cause the wireless communication circuit 214 to transmit respective first messages including commands to one or more lighting control devices of an associated lighting control system. The first command messages may control the one or more lighting control devices to adjust the ambient light intensity in accordance with an increment of light intensity. The increment of light intensity may be predetermined (e.g., specified in the lighting preset), may be based on the measured ambient light intensity, or may be otherwise determined. The control circuit 210 may be configured to wait a predetermined interval of time after transmitting the first command messages, and after expiration of the interval of time, to cause the light detection circuit 216 to perform a measurement of the adjusted ambient light intensity at the remote control device 200.

If the adjusted ambient light intensity at the remote control device 200 does not agree with the desired light intensity, the control circuit 210 may cause the wireless communication circuit 214 to transmit respective second messages including commands to the one or more lighting control devices of an associated lighting control system. The second command messages may control the one or more lighting control devices to adjust the ambient light intensity in accordance with the increment of light intensity. The control circuit 210 may be configured to again wait the predetermined interval of time, and after expiration of the interval of time, to cause the light detection circuit 216 to again perform a measurement of the adjusted ambient light intensity at the remote control device 200.

The control circuit 210 may be configured to repeat the above-described process until the adjusted ambient light intensity at the remote control device 200 agrees with the desired light intensity. When the measured ambient light intensity at the remote control device 200 agrees with the desired light intensity, the remote control device 200 may stop transmitting command messages to the one or more lighting control devices of the associated lighting control system. The control circuit 210 may be configured to indicate that the desired light intensity associated with the lighting preset has been reached, for example by exhibiting an indication on a display of the remote control device 200 (e.g., the touch display 156).

Alternatively, the remote control device 200 may be configured to cause one or more lighting control devices of an associated lighting control system to individually adjust corresponding sources of artificial and/or natural light incrementally, until the measured ambient light intensity agrees with the desired light intensity. For example, the control circuit 210 may be configured to cause the wireless communication circuit 214 to transmit respective messages including commands to the one or more lighting control devices, that cause the one or more lighting control devices to incrementally adjust the ambient light intensity at the remote control device 200 until the adjusted ambient light intensity agrees with the desired light intensity. The control circuit 210 may be further configured to cause the wireless communication circuit 214 to transmit respective messages including commands to the one or more lighting control devices, that cause the one or more lighting control devices to stop incrementally adjusting the ambient light intensity at the remote control device 200, for instance when the adjusted ambient light intensity agrees with the desired light intensity.

The remote control device 200 may be configured to learn (e.g., to adjust operation) in accordance with how an associated lighting control system is controlled by one or more users of the remote control device 200 (e.g., based on previous selections of lighting presets). For example, if a particular lighting preset (e.g., a reading preset) is consistently selected at approximately the same time each day, and if the ambient light intensity measured by the light detection circuit 216 does not vary substantially from day to day at the time when the reading preset is selected, the control circuit 210 may be configured (e.g., reconfigured) to cause the wireless communication circuit 214 to transmit respective messages including commands to one or more lighting control devices of the lighting control system, that cause the one or more lighting control devices to adjust the ambient light intensity at the remote control device 200 toward the desired light intensity more quickly (e.g., using larger increments of light intensity or a single increment of light intensity). For instance, if a difference between an initial ambient light intensity measured by the light detection circuit 216 and the desired light intensity is consistently large, the control circuit 210 may be configured (e.g., reconfigured) to cause the wireless communication circuit 214 to transmit respective messages including commands to one or more lighting control devices of the lighting control system, that cause the one or more lighting control devices to adjust the ambient light intensity at the remote control device 200 by a larger first increment, so as to adjust the ambient light intensity at the remote control device 200 toward the desired light intensity more quickly.

The remote control device 200 may be configured to adjust the ambient light intensity at the remote control device 200 so as to maximize an amount of natural light that arrives at the remote control device 200 (e.g., to maximize the natural light in a space where the remote control device 200 is located). For example, the control circuit 210 may be configured to cause the ambient light intensity at the remote control device 200 to first be adjusted via the one or more lighting control devices that control an amount of natural light that arrives at the remote control device 200, before being adjusted via the one or more lighting control devices that control corresponding sources of artificial light. Alternatively, the remote control device 200 may be configured to adjust the ambient light intensity at the remote control device 200 so as to maximize an amount of artificial light at the remote control device 200 (e.g., to maximize the artificial light in a space where the remote control device 200 is located). The remote control device 200 may perform such maximization of natural or artificial light, for example, responsive to the activation of a user-selectable preference setting made available on the remote control device 200 (e.g., via an application that executes on the remote control device 200).

In an illustrative example of adjusting ambient light intensity to maximize natural light, the remote control device 200 may be associated with the lighting control system 100 shown in FIG. 1. If the remote control device 200 is actuated to increase the amount of ambient light at the remote control device 200 in accordance with maximizing natural light at the remote control device 200, the control circuit 210 may cause the wireless communication circuit 214 to transmit a first command message to the motorized window treatment 130 that causes the motorized window treatment 130 to adjust the ambient light intensity at the remote control device 200 by raising the covering material 132 until the adjusted ambient light intensity agrees with the desired light intensity, or until an adjustment limit of the motorized window treatment 130 is reached (e.g., until the covering material reaches an open limit stop). If an adjustment limit of the motorized window treatment 130 is reached, the control circuit 210 may cause the wireless communication circuit 214 to transmit a second command message to the dimmer switch 110 to further adjust the ambient light intensity at the remote control device 200 by raising the intensity of the lighting load 114 until the adjusted ambient light intensity agrees with the desired light intensity, or until an adjustment limit of the dimmer switch 110 is reached (e.g., until the lighting load 114 reaches maximum intensity).

If the remote control device 200 is actuated to decrease the amount of ambient light at the remote control device 200 in accordance with maximizing natural light at the remote control device 200, the control circuit 210 may first cause the dimmer circuit 110 to decrease the intensity of the lighting load 114 (e.g., until the adjusted ambient light intensity agrees with the desired light intensity or until the lighting load 114 turns off or reaches minimum intensity), and may then cause the motorized window treatment 130 to lower the covering material 132 to further adjust the ambient light intensity at the remote control device 200. If the remote control device 200 is actuated to increase the amount of ambient light at the remote control device 200 in accordance with maximizing artificial light at the remote control device 200, the control circuit 210 may first cause the dimmer circuit 110 to increase the intensity of the lighting load 114 (e.g., until the adjusted ambient light intensity agrees with the desired light intensity or until the lighting load 114 reaches maximum intensity), and may then cause the motorized window treatment 130 to raise the covering material 132 to further adjust the ambient light intensity at the remote control device 200. If the remote control device 200 is actuated to decrease the amount of ambient light at the remote control device 200 in accordance with maximizing artificial light at the remote control device 200, the control circuit 210 may first cause the motorized window treatment 130 to lower the covering material 132 (e.g., until the adjusted ambient light intensity agrees with the desired light intensity or until the covering material 132 reaches a closed limit stop), and may then cause the dimmer circuit 110 to decrease the intensity of the lighting load 114 to further adjust the ambient light intensity at the remote control device 200.

The remote control device 200 may be configured to adjust the ambient light intensity at the remote control device 200 in accordance with a hierarchy of lighting control devices of an associated lighting control system. In such a hierarchy, lighting control devices may be ranked in an order of preferred operation, such that lighting control devices of higher rank are operated before those of lower rank to adjust the ambient light intensity at the remote control device 200. A lighting control device hierarchy may be configured, for example, by a user of the remote control device 200 (e.g., via an application that executes on the remote control device 200). In an example hierarchy, one or more lighting control devices that control sources of artificial light may be ranked higher than one or more lighting control devices that control an amount of natural light that arrives at the remote control device 200. In accordance with such an example hierarchy, the control circuit 210 may be configured to cause the ambient light intensity at the remote control device 200 to first be adjusted via one or more lighting control devices that control corresponding sources of artificial light, before being adjusted via one or more lighting control devices that control an amount of natural light that arrives at the remote control device 200. In accordance with another example hierarchy, the control circuit 210 may be configured to cause the ambient light intensity at the remote control device 200 to first be adjusted via one or more lighting control devices that control an amount of natural light that arrives at the remote control device 200, before being adjusted via one or more lighting control devices that control corresponding sources of artificial light. It should be appreciated that lighting control device hierarchies are not limited to rankings based on the type of light controlled. For example, a lighting control device hierarchy may include lighting control device groups having different ranks, with one or more groups of the hierarchy including a mix of lighting control devices that control different types of light.

In an illustrative example of hierarchical ambient light intensity adjustment, the remote control device 200 may be associated with the lighting control system 100 shown in FIG. 1, and the lighting control system 100 may define a hierarchy in which the dimmer switch 110 is ranked higher than the motorized window treatment 130. Upon actuation, the control circuit 210 may be configured to cause the wireless communication circuit 214 to transmit a first command message to the higher-ranked dimmer switch 110 that causes the dimmer switch 110 to adjust the ambient light intensity at the remote control device 200 (e.g., by increasing or decreasing the intensity of the lighting load 114) until the adjusted ambient light intensity agrees with the desired light intensity, or until an adjustment limit of the dimmer switch 110 is reached (e.g., until the lighting load 114 is turned off or reaches maximum intensity). The control circuit 210 may be configured to, if the adjustment limit of the dimmer switch 110 is reached, cause the wireless communication circuit 214 to transmit a second command message to a the lower-ranked motorized window treatment 130, to further adjust the ambient light intensity at the remote control device 200 (e.g., by raising or lowering the covering material 132) until the adjusted ambient light intensity agrees with the desired light intensity, or until an adjustment limit of the motorized window treatment 130 is reached (e.g., until the covering material 132 reaches the opened or closed positions). It should be appreciated that remote control device 200 is not limited to the above-described example lighting control device hierarchy. For example, the hierarchy of lighting control devices may alternatively be defined such that the motorized window treatment 130 is ranked higher than the dimmer switch 110 within the hierarchy.

The remote control device 200 may be configured to, once the ambient light intensity at the remote control device 200 agrees with the desired light intensity, maintain the ambient light intensity at the remote control device 200 in accordance with the desired light intensity, for instance until a different lighting preset is selected, until a currently selected lighting preset is unselected, until the remote control device 200 is moved to another location (e.g., as determined by the locator circuit 222), or the like. The ambient light intensity in a space may change over time after the ambient light intensity at the remote control device 200 has been adjusted to agree with the desired light intensity. For example, the intensity of natural light in the space may change (e.g., with the rising or setting of the sun). This may cause the ambient light intensity at the remote control device 200 to fall out of agreement with the desired light intensity.

In order to maintain agreement between the ambient light intensity at the remote control device 200 and the desired light intensity, the control circuit 210 may be configured to, once the ambient light intensity at the remote control device 200 agrees with the desired light intensity, cause the light detection circuit 216 to periodically measure the ambient light intensity at the remote control device 200, and to compare each periodic ambient light intensity measurement to the desired light intensity. The control circuit 210 may be further configured to, if a periodic measurement of the ambient light intensity at the remote control device 200 disagrees with the desired light intensity, cause the wireless communication circuit 214 to transmit respective control messages to one or more lighting control devices to adjust the ambient light intensity until the ambient light intensity again agrees with the desired light intensity. To illustrate, the remote control device 200 may be configured to, when placed on a task surface, maintain a desired light intensity associated with the task surface while the remote control device 200 is located on the task surface.

The remote control device 200 may be configured to adjust the ambient light intensity at the remote control device 200 in accordance with a selected lighting preset if a user of the remote control device 200 moves the remote control device 200 from one location to another (e.g., within a space). In this regard, the remote control device 200 and an associated lighting control system (e.g., the lighting control system 100) may allow a lighting preset to follow a user. To illustrate, a user may be located in a first location (e.g., a first room in a home), and may select a lighting preset using the remote control device 200. Upon actuation, the control circuit 210 may cause the ambient light intensity at the first location of the remote control device 200 to be adjusted until the ambient light intensity at the remote control device 200 agrees with a desired light intensity associated with the lighting preset, for example as described herein. The control circuit 210 may store an ambient light intensity measurement (e.g., an initial measurement taken when the lighting preset is selected) in the memory 220. If the user subsequently moves to a second location (e.g., a second room in the home), taking the remote control device 200 along, the control circuit 210 may, upon arriving at the second location, cause the ambient light intensity at second location of the remote control device 200 to be adjusted until the ambient light intensity at the remote control device 200 agrees with a desired light intensity associated with the lighting preset, for example as described herein.

The control circuit 210 may further be configured to retrieve the initial ambient light intensity measurement from the first location of the remote control device 200, and may adjust the ambient lighting conditions at the first location to agree with the initial ambient light intensity measurement taken at the first location, for example by controlling one or more lighting control devices at the first location to revert to settings that were active prior to selection of the lighting preset at the first location, and/or via collaboration between the remote control device 200 and one or more components of an associated lighting control system, such as a second remote control device 200 that is located at the first location. In this regard, the remote control device 200 may be configured restore ambient lighting conditions at a location after the remote control device 200 has been moved from the location, and the selected lighting preset is no longer desired at the location.

The remote control device 200 may be configured to determine if an obstruction is blocking the light detector of the light detection circuit 216. The light detector may be blocked, for instance, by an object that is placed on the remote control device 200. The remote control device 200 may optionally include a camera 226. The camera 226 may, for example, be oriented to face substantially the same direction as the light detector. In an example of obstruction detection, the control circuit 210 may be configured to, when a lighting preset is selected, for example responsive to an input received at the user interface 212, cause the camera 226 to take a picture. The picture may represent an unobstructed state of the light detector, and may be stored in the memory 220. The control circuit 210 may be configured to subsequently cause the camera 226 to take one or more additional pictures (e.g., in accordance with predetermined intervals of time), and may compare the one or more subsequent pictures with the picture stored in the memory 220. If, based on such a comparison, the control circuit 210 identifies a substantial difference between a subsequent picture and the picture in the memory 220, the control circuit 210 may determine that an obstruction is blocking the light detector, and may cease adjusting the ambient light intensity at the remote control device 200 (e.g., by not causing the wireless communication circuit 214 to send control messages to one or more lighting control devices of an associated lighting control system).

In another example of obstruction detection, the control circuit 210 may be alternatively configured, or further configured, to determine that an obstruction is blocking the light detector if, for example, after the control circuit 210 causes the wireless communication circuit 214 to transmit a predetermined number of control messages to one or more lighting control devices of an associated lighting control system, subsequent corresponding measurements by the light detection circuit 216 (e.g., by the light detector), indicate that the ambient light intensity at the remote control device 200 is remaining substantially constant. If the ambient light intensity at the remote control device 200 so remains constant, the control circuit 210 may determine that an obstruction is blocking the light detector, and may cease adjusting the ambient light intensity at the remote control device 200 (e.g., by not causing the wireless communication circuit 214 to send control messages to one or more lighting control devices of an associated lighting control system).

The remote control device 200 may optionally include a proximity sensor, such as a passive infrared detector 228. In still another example of obstruction detection, the control circuit 210 may be alternatively configured to, or further configured to, when a lighting preset is selected (e.g., responsive to an input received at the user interface 212), capture an output of the passive infrared detector 228 (e.g., an output corresponding to one or more infrared light measurements made by the passive infrared detector 228). Such an infrared light measurement may represent an unobstructed state of the light detector, and may be referred to as an unobstructed measurement. The control circuit 210 may cause the unobstructed measurement to be stored in the memory 220. The control circuit 210 may be configured to subsequently capture additional measurement s from the passive infrared detector 228 (e.g., in accordance with predetermined intervals of time), and may compare the additional measurements with the unobstructed measurement. If, based on such a comparison, the control circuit 210 identifies a substantial difference between a subsequent measurement and the unobstructed measurement, the control circuit 210 may determine that an obstruction is blocking the light detector, and may cease adjusting the ambient light intensity at the remote control device 200 (e.g., by not causing the wireless communication circuit 214 to send control messages to one or more lighting control devices of an associated lighting control system). Additionally, the control circuit 210 may be further configured to cease adjusting the ambient light intensity at the remote control device 200 if a measurement from the passive infrared detector 228 indicates that a user of the remote control device 200 is holding the remote control device 200 close to the user's body (e.g., next to the user's head).

The remote control device 200 may be configured to adjust the ambient light intensity at the remote control device 200 in accordance with respective amounts of natural light and artificial light at the remote control device 200 (e.g., in a space where the remote control device 200 is located). For example, the control circuit 210 may be configured to cause the light detection circuit 216 to separately measure the respective intensities of artificial light and natural light at the remote control device 200. The control circuit 210 may be configured to cause the light detection circuit 216 to detect whether the artificial light intensity is greater than the natural light intensity at the remote control device 200, or whether the natural light intensity is greater than the artificial light intensity at the remote control device 200. For example, the control circuit 210 may be configured to analyze the spectrum (e.g., the spectral content) of the ambient light detected by the light detector of the remote control device 200, to determine which of the artificial light intensity or the natural light intensity is greater in a space, and in particular at the remote control device 200.

The remote control device 200 may be configured to control one or more lighting control devices of an associated lighting control system (e.g., the lighting control system 100) to adjust the ambient light intensity at the remote control device 200 based on the respective measurements of natural light and artificial light at the remote control device 200. For example, if the measured natural light intensity is greater than the measured artificial light intensity at the remote control device 200, the remote control device 200 may control one or more lighting control devices that are associated with the natural light (e.g., the motorized window treatment 130) before controlling one or more lighting control devices that are associated with the artificial light (e.g., the dimmer switch 110), to adjust the ambient light intensity at the remote control device 200. In another example, if the measured artificial light intensity is greater than the measured natural light intensity at the remote control device 200, the remote control device 200 may control one or more lighting control devices that are associated with the artificial light (e.g., the dimmer switch 110) before controlling one or more lighting control devices that are associated with the natural light (e.g., the motorized window treatment 130), to adjust the ambient light intensity at the remote control device 200. In this regard, the remote control device 200 may be configured to control one or more lighting control devices of an associated lighting control system (e.g., the lighting control system 100), in order to adjust a ratio of artificial light to natural light within a space (e.g., at the remote control device 200).

The remote control device 200 may be configured to control one or more lighting control devices of an associated lighting control system (e.g., the lighting control system 100) to adjust the ambient light intensity at the remote control device 200 based on a predetermined priority (e.g., a user configured preference) for natural lighting over artificial lighting or for artificial lighting over natural lighting. For example, if a lighting preset (e.g., a preset light intensity) prioritizes natural light over artificial light, the remote control device 200 may control one or more lighting control devices that are associated with the natural light (e.g., the motorized window treatment 130) before controlling one or more lighting control devices that are associated with the artificial light (e.g., the dimmer switch 110), to adjust the ambient light intensity at the remote control device 200. This may, for example, maximize daylight that enters a space. In another example, if a lighting preset (e.g., a preset light intensity) prioritizes artificial light over natural light, the remote control device 200 may control one or more lighting control devices that are associated with the artificial light (e.g., the dimmer switch 110) before controlling one or more lighting control devices that are associated with the natural light (e.g., the motorized window treatment 130), to adjust the ambient light intensity at the remote control device 200. This may, for example, minimize daylight that enters a space.

In an illustrative example of using the lighting control system 100 of FIG. 1, a user input that is indicative of a lighting preset (e.g., a desired light intensity) may be received at a remote control device 140 of the lighting control system 100 (e.g., at the wireless communication device 150 or the remote control device 170). In response to receipt of the user input, the remote control device 140 may measure the ambient light intensity at the remote control device 140, and may compare the measured ambient light intensity to the desired light intensity, for example as described herein. If the measured ambient light intensity disagrees with the desired light intensity, the remote control device 140 may transmit one or more messages (e.g., including commands) to the dimmer switch 110, for instance directly or via a wireless router. The dimmer switch 110 may adjust the intensity of the lighting load 114 in response to commands included in the messages, such that the dimmer switch 110 controls the lighting load 114 in response to the input received at the user interface of the remote control device 140.

In another illustrative example, the remote control device 200 may be implemented in a smart television (e.g., a smart HDTV monitor). The smart television may include a light detector and a communication circuit (e.g., a wired and/or wireless communication circuit). The smart television may be configured to transmit signals (e.g., RF signals) to one or more lighting control devices of an associated lighting control system. The smart television may define a user interface that includes one or more buttons (e.g., soft buttons and/or physical buttons), for example on the smart television and/or on a remote control device (e.g., an infrared (IR) remote control device) that is associated with the smart television, that are configured to receive inputs related to the remote control device 200. In an example, a user of the smart television may use the remote control device to select a lighting preset for television viewing. The remote control device may then cause the ambient light intensity at the smart television and/or the remote control device to be adjusted until the ambient light intensity agrees with a desired light intensity that is associated with the lighting preset, for example as described herein. For instance, the smart television and/or the remote control device may include a light detector for measuring the ambient light intensity at the smart television. Upon actuation, the smart television and/or the remote control device may measure the ambient light intensity, and may transmit command messages to one or more lighting control devices of an associated lighting control system to adjust the ambient light intensity.

Alternatively, the smart television and/or the remote control device may be configured to transmit an ambient light intensity measurement to another remote control device 200, such as a smart phone. The smart phone may be configured to receive the ambient light intensity measurement, and to transmit command messages to the one or more lighting control devices of the associated lighting control system to adjust the ambient light intensity. If neither of the smart television or the remote control device includes a light detector, a light detector unit may be plugged into a port (e.g., an Ethernet port or an HDMI port) on the smart television and/or the remote control device. In an example, the plug-in light detector unit may be configured to transmit an ambient light intensity measurement to the smart television. The smart television may be configured to receive the ambient light intensity measurement, and to transmit command messages to the one or more lighting control devices of the associated lighting control system to adjust the ambient light intensity. Alternatively, the plug-in light detector unit may be configured to transmit command messages directly to the one or more lighting control devices of the associated lighting control system to adjust the ambient light intensity, bypassing the smart television.

Figure 3:
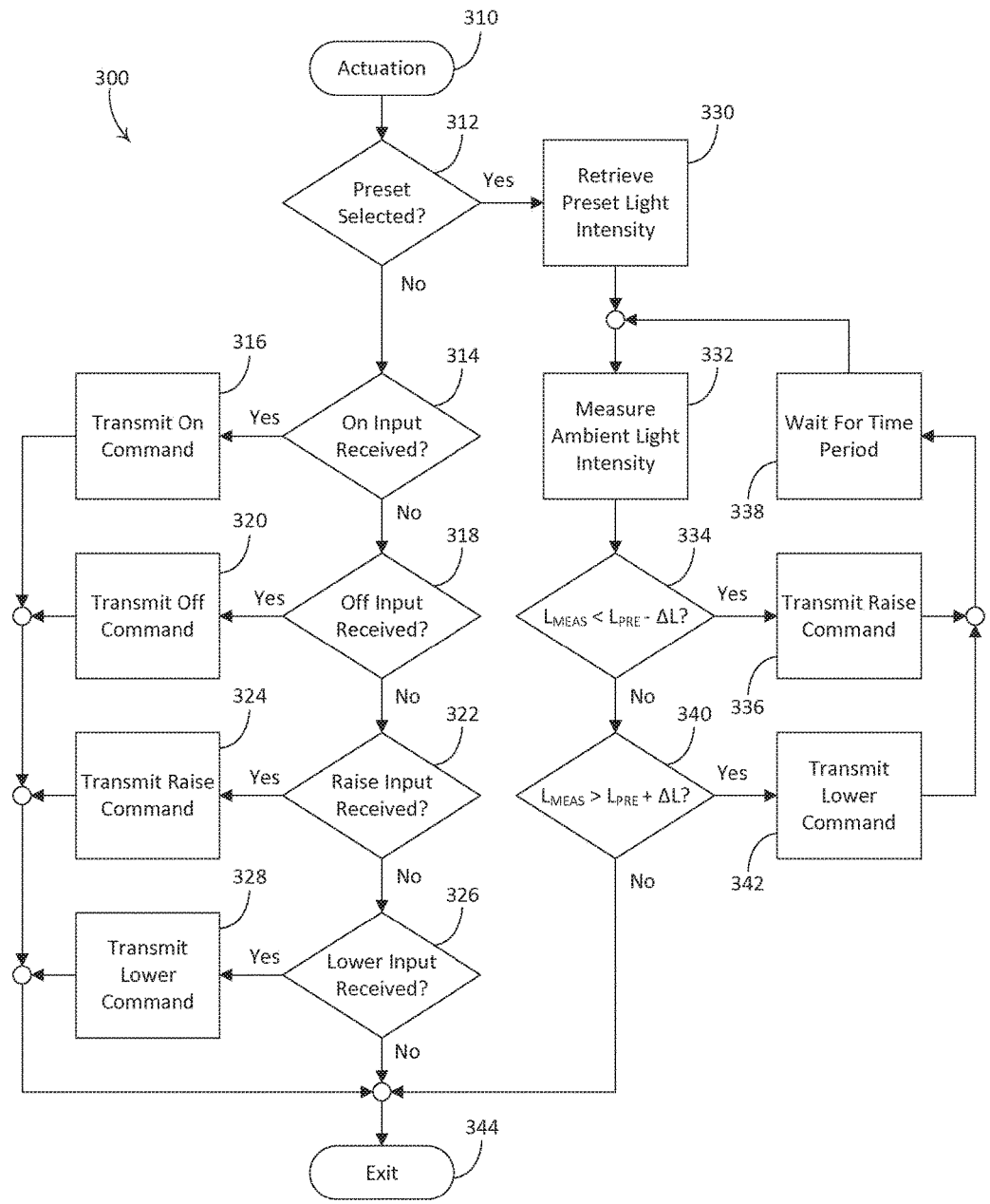
FIG. 3 depicts a flow diagram that illustrates an example process that may be executed by a remote control device to control a lighting control device of an associated lighting control system.

FIG. 3 illustrates an example process 300 that may be executed by a remote control device (e.g., the remote control device 200) that is associated with a lighting control system, to control one or more lighting control devices of the lighting control system. For example, the remote control device 200 may be implemented as one or both of the remote control devices 140 (e.g., the wireless communication device 150 and the remote control device 170) of the lighting control system 100 shown in FIG. 1, to control the dimmer switch 110 and/or the motorized window treatment 130 to adjust the ambient light intensity in a space (e.g., at the remote control device 200). The example process 300 may be executed, for example, by the control circuit 210 of the remote control device 200.

The process 300 may be actuated in response to receipt, at 310, of an input (e.g., a user input) at the user interface 212 of the remote control device 200. The user input may include, for example, a user selection of a lighting preset or a command to control one or more lighting control devices of an associated lighting control system. The user input received at the user interface 212 may include, for example, an activation of a soft button exhibited on the touch display 156, a voice command received at the microphone 158, or the operation of one or more of the buttons 160 of the wireless communication device 150, or may include the operation of one or more of the buttons 174-182 of the remote control device 170.

If, at 312, the received input is not the activation of a control that corresponds to a user selection of a lighting preset (e.g., a preset button), the control circuit 210 may transmit a command message that is not associated with a lighting preset. For example, at 314, if the input is the activation of a control that corresponds to an on command, the control circuit 210 may, at 316, cause the wireless communication circuit 214 to transmit a command message to a lighting control device that corresponds to an on command, and the process 300 may then terminate at 344. At 318, if the input is the activation of a control that corresponds to an off command, the control circuit 210 may, at 320, cause the wireless communication circuit 214 to transmit a command message to a lighting control device that corresponds to an off command, and the process 300 may then terminate at 344. At 322, if the input is the activation of a control that corresponds to a raise command, the control circuit 210 may, at 324, cause the wireless communication circuit 214 to transmit a command message to a lighting control device that corresponds to a raise command, and the process 300 may then terminate at 344. At 326, if the input is the activation of a control that corresponds to a lower command, the control circuit 210 may, at 328, cause the wireless communication circuit 214 to transmit a command message to a lighting control device that corresponds to a lower command, and the process 300 may then terminate at 344.

If, at 312, the received input is the activation of a control that corresponds to a user selection of a lighting preset (e.g., a preset button), the control circuit 210 may, at 330, retrieve (e.g., from the memory 220) information that corresponds to the lighting preset. The information may include, for example, a desired light intensity that is associated with the lighting preset. The desired light intensity may be referred to as a preset light intensity, and may be designated as $L_{PRE}$.

The control circuit 210 may, at 332, cause the light detection circuit 216 to perform a measurement of an intensity of ambient light at the remote control device 200. The light detection circuit 216 may be configured to measure the light intensity at the remote control device 200 using the light detector (e.g., the light detector 152 of the wireless communication device 150 or the light detector 172 of the remote control device 170), to produce a measured ambient light intensity value. The measured ambient light intensity may be designated as $L_{MEAS}$.

The control circuit 210 may compare the measured ambient light intensity $L_{MEAS}$ to the preset light intensity $L_{PRE}$. The comparison may be made in accordance with an acceptable range of light intensity around the preset light intensity $L_{PRE}$, the bounds of which may be associated with the lighting preset, and may be configured, for example, by a user of the remote control device 200. In an example, the acceptable range of light intensity around the preset light intensity $L_{PRE}$ may correspond to an offset value $\Delta L$ of light intensity. The offset value $\Delta L$ of light intensity may correspond to an acceptable difference threshold between the measured ambient light intensity $L_{MEAS}$ and the preset light intensity $L_{PRE}$. The offset value $\Delta L$ of light intensity may be a single value, such as a positive value or zero, which corresponds to both an upper bound and a lower bound of the acceptable range of light intensity around the preset light intensity $L_{PRE}$. For example, the measured ambient light intensity $L_{MEAS}$ may be acceptable if it falls within a light intensity range defined by a lower bound that corresponds to $L_{PRE}-\Delta L$ and an upper bound that corresponds to $L_{PRE}+\Delta L$. If the measured ambient light intensity $L_{MEAS}$ falls within such a range (e.g., if the measured ambient light intensity agrees with the desired light intensity), the process 300 may terminate at 344. The acceptable range of light intensity around the preset light intensity $L_{PRE}$ need not be bounded by a single light intensity offset value $\Delta L$. For example, alternatively, separate offset values may be specified to correspond to respective upper and lower bounds of the acceptable range of light intensity around the preset light intensity $L_{PRE}$.

At 334, if the measured ambient light intensity $L_{MEAS}$ is less than the preset light intensity $L_{PRE}$ minus the offset value $\Delta L$ (e.g., if the measured ambient light intensity disagrees with the desired light intensity), the control circuit 210 may, at 336, cause the wireless communication circuit 214 to transmit a command message to a lighting control device that corresponds to a raise command. The control circuit 210 may then, at 338, wait for a predetermined period of time. The predetermined period of time may be of sufficient duration to allow one or more lighting control devices to adjust the ambient light intensity at the remote control device 200.

Upon expiration of the period of time, the control circuit 210 may, returning to 332, cause the light detection circuit 216 to perform a measurement of the adjusted intensity of ambient light at the remote control device 200. The control circuit 210 may then compare the measured adjusted ambient light intensity $L_{MEAS}$ to the preset light intensity $L_{PRE}$ in accordance with the light intensity offset value $\Delta L$. If, returning to 334, the measured ambient light intensity $L_{MEAS}$ is still less than the preset light intensity $L_{PRE}$ minus the offset value $\Delta L$ (e.g., $L_{PRE}-\Delta L$), the control circuit 210 may, returning to 336, cause the wireless communication circuit 214 to transmit another command message to a lighting control device that corresponds to a raise command. The control circuit 210 may then again wait for the predetermined period of time (returning to 338), cause the light detection circuit 216 to perform a measurement of the adjusted intensity of ambient light at the remote control device 200 (returning to 332), and compare the measured adjusted ambient light intensity $L_{MEAS}$ to $L_{PRE}-\Delta L$. The control circuit 210 may repeat this pattern of measurement, comparison, adjustment, waiting, measurement, and so on, until the measured ambient light intensity $L_{MEAS}$ falls within the acceptable range of light intensity around the preset light intensity $L_{PRE}$. When $L_{MEAS}$ falls within the acceptable range of light intensity around the preset light intensity $L_{PRE}$ (e.g., when $L_{MEAS}$ is equal to $L_{PRE}$), such that the measured ambient light intensity agrees with the desired light intensity, the process 300 may terminate at 344.

At 340, if the measured ambient light intensity $L_{MEAS}$ is greater than the preset light intensity $L_{PRE}$ plus the offset value $\Delta L$ (e.g., if the measured ambient light intensity disagrees with the desired light intensity), the control circuit 210 may, at 342, cause the wireless communication circuit 214 to transmit a command message to a lighting control device that corresponds to a lower command. The control circuit 210 may then, at 338, wait for the predetermined period of time.

Upon expiration of the period of time, the control circuit 210 may, returning to 332, cause the light detection circuit 216 to perform a measurement of the adjusted intensity of ambient light at the remote control device 200. The control circuit 210 may then compare the measured adjusted ambient light intensity $L_{MEAS}$ to the preset light intensity $L_{PRE}$ in accordance with the light intensity offset value $\Delta L$. If, returning to 340, the measured ambient light intensity $L_{MEAS}$, is still greater than the preset light intensity $L_{PRE}$ plus the offset value $\Delta L$ (e.g., $L_{PRE}+\Delta L$), the control circuit 210 may, returning to 342, cause the wireless communication circuit 214 to transmit another command message to a lighting control device that corresponds to a lower command. The control circuit 210 may then again wait for the predetermined period of time (returning to 338), cause the light detection circuit 216 to perform a measurement of the adjusted intensity of ambient light at the remote control device 200 (returning to 332), and compare the measured adjusted ambient light intensity $L_{MEAS}$ to $L_{PRE}+\Delta L$. The control circuit 210 may repeat this pattern of measurement, comparison, adjustment, waiting, measurement, and so on, until the measured ambient light intensity $L_{MEAS}$ falls within the acceptable range of light intensity around the preset light intensity $L_{PRE}$. When $L_{MEAS}$ falls within the acceptable range of light intensity around the preset light intensity $L_{PRE}$ (e.g., when $L_{MEAS}$ is equal to the $L_{PRE}$), such that the measured ambient light intensity agrees with the desired light intensity, the process 300 may terminate at 344.

Figure 4A:
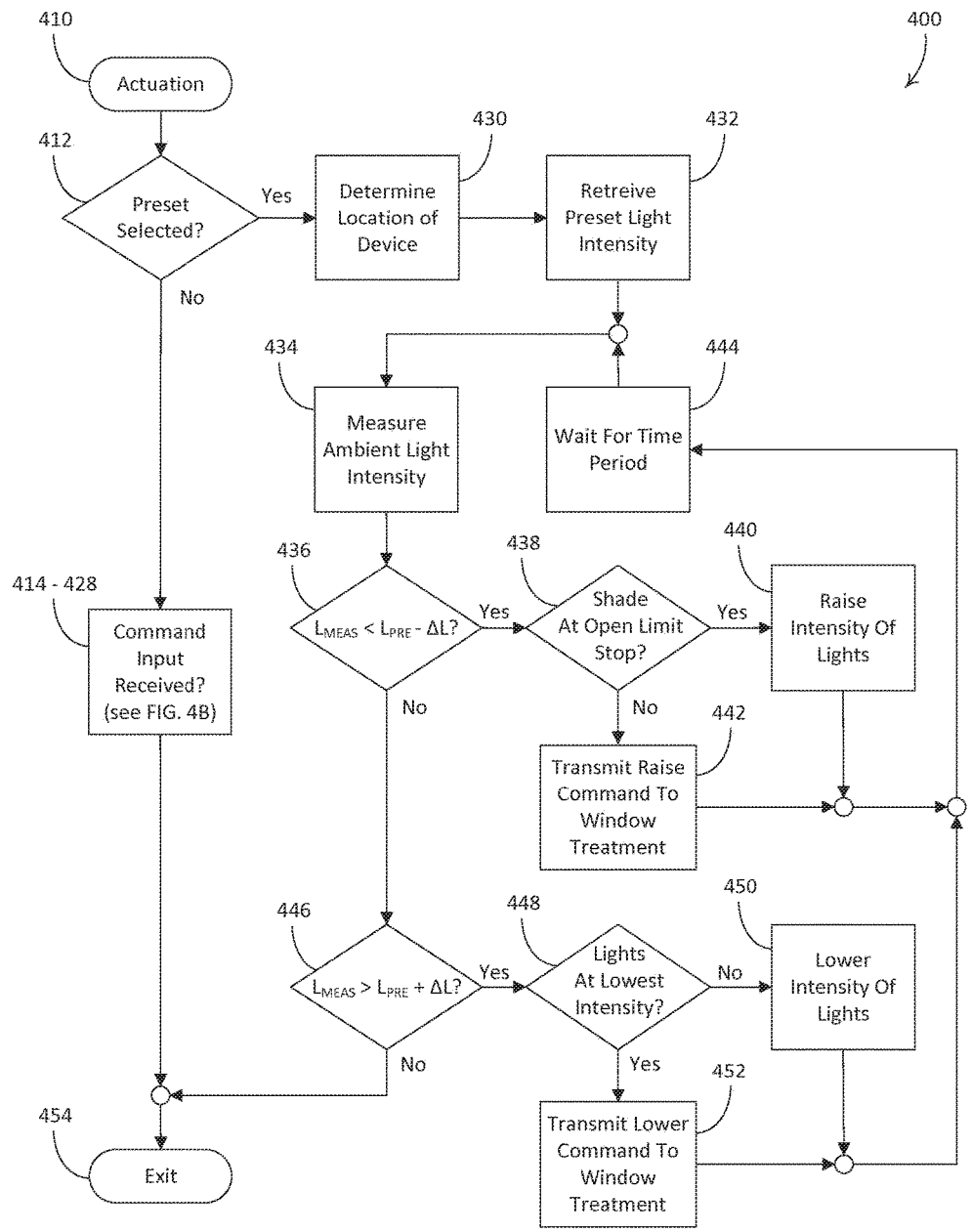
FIGS. 4A and 4B depict a flow diagram that illustrates another example process that may be executed by a remote control device to control a lighting control device of an associated lighting control system.
Figure 4B:
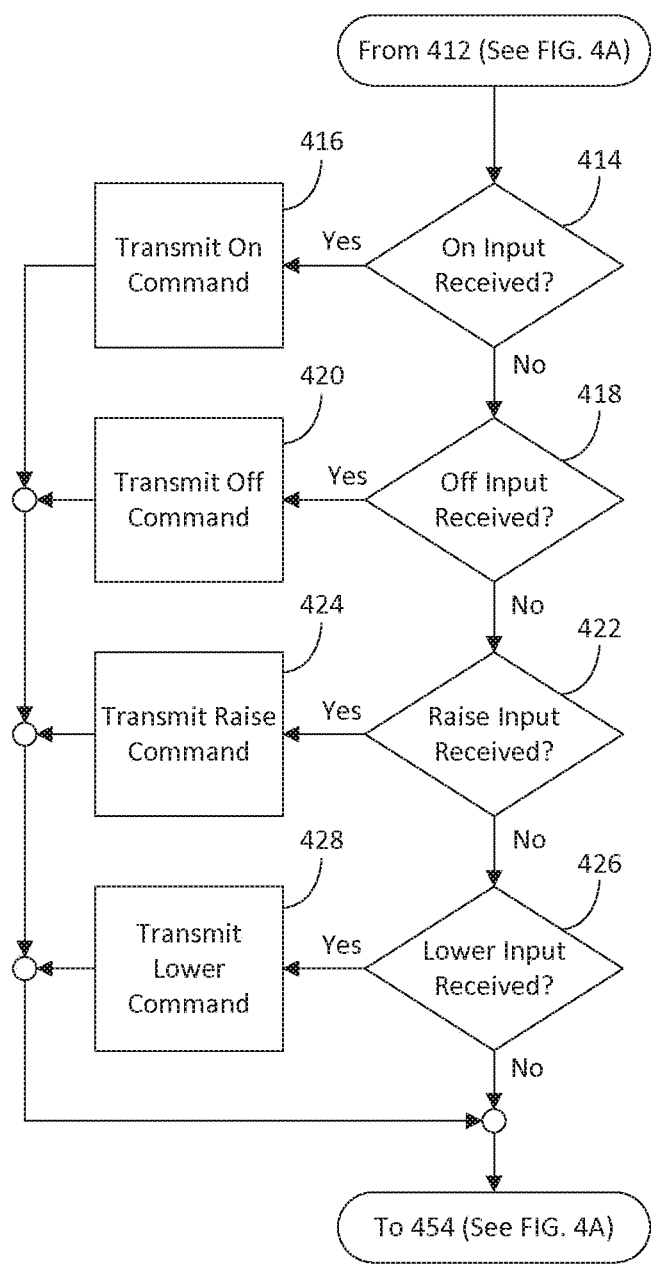

FIGS. 4A and 4B illustrate another example process 400 that may be executed by a remote control device (e.g., the remote control device 200) that is associated with a lighting control system, to control one or more lighting control devices of the lighting control system. For example, the remote control device 200 may be implemented as a remote control device 140 (e.g., a wireless communication device 150, a remote control device 170) in the lighting control system 100 shown in FIG. 1, to control the dimmer switch 110 and the motorized window treatment 130 to adjust the ambient light intensity in a space (e.g., at the remote control device 200). The example process 400 may be executed, for example, by the control circuit 210 of the remote control device 200. The process 400 may be associated, for example, with a lighting preset for which natural light is preferred over artificial light.

The process 400 may be actuated in response to receipt, at 410, of an input (e.g., a user input) at the user interface 212 of the remote control device 200. The user input may include, for example, a user selection of a lighting preset or a command to control one or more lighting control devices of an associated lighting control system. The user input received at the user interface 212 may include, for example, an activation of a soft button exhibited on the touch display 156, a voice command received at the microphone 158, or the operation of one or more of the buttons 160 of the wireless communication device 150, or may include the operation of one or more of the buttons 174-182 of the remote control device 170.

If, at 412, the received input is not the activation of a control that corresponds to a user selection of a lighting preset (e.g., a preset button), the control circuit 210 may transmit a command message that is not associated with a lighting preset (e.g., as shown in FIG. 4B). For example, at 414, if the input is the activation of a control that corresponds to an on command, the control circuit 210 may, at 416, cause the wireless communication circuit 214 to transmit a command message to a lighting control device that corresponds to an on command, and the process 400 may then terminate at 454. At 418, if the input is the activation of a control that corresponds to an off command, the control circuit 210 may, at 420, cause the wireless communication circuit 214 to transmit a command message to a lighting control device that corresponds to an off command, and the process 400 may then terminate at 454. At 422, if the input is the activation of a control that corresponds to a raise command, the control circuit 210 may, at 424, cause the wireless communication circuit 214 to transmit a command message to a lighting control device that corresponds to a raise command, and the process 400 may then terminate at 454. At 426, if the input is the activation of a control that corresponds to a lower command, the control circuit 210 may, at 428, cause the wireless communication circuit 214 to transmit a command message to a lighting control device that corresponds to a lower command, and the process 400 may then terminate at 454.

If, at 412, the received input is the activation of a control that corresponds to a user selection of a lighting preset (e.g., a preset button), the control circuit 210 may optionally, at 430, cause the locator circuit 222 to determine a current location of the remote control device 200. Alternatively, the control circuit 210 may otherwise determine the current location of the remote control device 200, for example using localization techniques as described herein. The control circuit 210 may use the current location of the remote control device 200, for example, to identify one or more lighting control devices that are within a predetermined proximity of the remote control device 200. In accordance with the example process 400, a dimmer switch (e.g., the dimmer switch 110) and a motorized window treatment (e.g., the motorized window treatment 130) may be located within the proximity to the remote control device 200. The control circuit 210 may, at 432, retrieve (e.g., from the memory 220) information that corresponds to the lighting preset. The information may include, for example, a desired light intensity that is associated with the lighting preset. The desired light intensity may be referred to as a preset light intensity, and may be designated as $L_{PRE}$.

The control circuit 210 may, at 434, cause the light detection circuit 216 to perform a measurement of an intensity of ambient light at the remote control device 200. The light detection circuit 216 may be configured to measure the light intensity at the remote control device 200 using the light detector (e.g., the light detector 152 of the wireless communication device 150 or the light detector 172 of the remote control device 170), to produce a measured ambient light intensity value. The measured ambient light intensity may be designated as $L_{MEAS}$.

The control circuit 210 may compare the measured ambient light intensity $L_{MEAS}$ to the preset light intensity $L_{PRE}$. The comparison may be made in accordance with an acceptable range of light intensity around the preset light intensity $L_{PRE}$, the bounds of bounds of which may be associated with the lighting preset, and may be configured, for example, by a user of the remote control device 200. In an example, the acceptable range of light intensity around the preset light intensity $L_{PRE}$ may correspond to an offset value $\Delta L$ of light intensity. The offset value $\Delta L$ of light intensity may correspond to an acceptable difference threshold between the measured ambient light intensity $L_{MEAS}$ and the preset light intensity $L_{PRE}$. The offset value $\Delta L$ of light intensity may be a single value, such as a positive value or zero, which corresponds to both an upper bound and a lower bound of the acceptable range of light intensity around the preset light intensity $L_{PRE}$. For example, the measured ambient light intensity $L_{MEAS}$ may be acceptable if it falls within a light intensity range defined by a lower bound that corresponds to $L_{PRE}-\Delta L$ and an upper bound that corresponds to $L_{PRE}+\Delta L$. If the measured ambient light intensity $L_{MEAS}$ falls within such a range (e.g., if the measured ambient light intensity agrees with the desired light intensity), the process 400 may terminate at 454. The acceptable range of light intensity around the preset light intensity $L_{PRE}$ need not be bounded by a single light intensity offset value $\Delta L$. For example, alternatively, separate offset values may be specified to correspond to respective upper and lower bounds of the acceptable range of light intensity around the preset light intensity $L_{PRE}$.

At 436, if the measured ambient light intensity $L_{MEAS}$ is less than the preset light intensity $L_{PRE}$ minus the offset value $\Delta L$ (e.g., if the measured ambient light intensity disagrees with the desired light intensity), the control circuit 210 may, at 438, determine whether the covering material 132 of the motorized window treatment 130 is positioned at an open limit stop (e.g., in the opened position). For example, the control circuit 210 may query the motorized window treatment 130 for a position of the covering material 132 (e.g., by causing the wireless communication circuit 214 to transmit a query message to the motorized window treatment 130). The motorized window treatment 130 may, responsive to the query, transmit information that relates to a current position of the covering material 132 to the control circuit 210. If the covering material 132 of the motorized window treatment 130 is at an open limit stop, the control circuit 210 may, at 440, cause the wireless communication circuit 214 to transmit a command message to the dimmer switch 110 to raise the intensity of one or more lighting loads controlled by the dimmer switch 110. If the covering material 132 of the motorized window treatment 130 is not at an open limit stop, the control circuit 210 may, at 442, cause the wireless communication circuit 214 to transmit a command message to the motorized window treatment 130 to raise the covering material (e.g., toward the opened position).

The control circuit 210 may then, at 444, wait for a predetermined period of time. The predetermined period of time may be of sufficient duration to allow the dimmer switch 110 or the motorized window treatment 130 to adjust the ambient light intensity at the remote control device 200. Upon expiration of the period of time, the control circuit 210 may, returning to 434, cause the light detection circuit 216 to perform a measurement of the adjusted intensity of ambient light at the remote control device 200. The control circuit 210 may then compare the measured adjusted ambient light intensity $L_{MEAS}$ to the preset light intensity $L_{PRE}$ in accordance with the light intensity offset value $\Delta L$. If, returning to 436, the measured ambient light intensity $L_{MEAS}$ is still less than the preset light intensity $L_{PRE}$ minus the offset value $\Delta L$ (e.g., $L_{PRE}-\Delta L$), the control circuit 210 may, returning to 438, determine whether the covering material 132 of the motorized window treatment 130 is positioned at an open limit stop (e.g., in the opened position). If the covering material 132 of the motorized window treatment 130 is at an open limit stop, the control circuit 210 may, at 440, cause the wireless communication circuit 214 to transmit a command message to the dimmer switch 110 to raise the intensity of one or more lighting loads controlled by the dimmer switch 110. If the covering material 132 of the motorized window treatment 130 is not at an open limit stop, the control circuit 210 may, at 442, cause the wireless communication circuit 214 to transmit a command message to the motorized window treatment 130 to raise the covering material (e.g., toward the opened position).

The control circuit 210 may then again wait for the predetermined period of time (returning to 444), cause the light detection circuit 216 to perform a measurement of the adjusted intensity of ambient light at the remote control device 200 (returning to 434), and compare the measured adjusted ambient light intensity $L_{MEAS}$ to the preset light intensity $L_{PRE}$. The control circuit 210 may repeat this pattern of measurement, comparison, adjustment, waiting, measurement, and so on, until the measured ambient light intensity $L_{MEAS}$ falls within the acceptable range of light intensity around the preset light intensity $L_{PRE}$. When $L_{MEAS}$ falls within the acceptable range of light intensity around the preset light intensity $L_{PRE}$ (e.g., when $L_{MEAS}$ is equal to $L_{PRE}$), such that the measured ambient light intensity agrees with the desired light intensity, the process 400 may terminate at 454.

At 446, if the measured ambient light intensity $L_{MEAS}$ is greater than the preset light intensity $L_{PRE}$ plus the offset value $\Delta L$ (e.g., if the measured ambient light intensity disagrees with the desired light intensity), the control circuit 210 may, at 448, determine whether one or more lighting loads controlled by the dimmer switch 110 are at respective lowest intensities (e.g., are off). For example, the control circuit 210 may query the dimmer switch 110 for respective intensities of the one or more lighting loads controlled by the dimmer switch 110 (e.g., by causing the wireless communication circuit 214 to transmit a query message to the dimmer switch 110). The dimmer switch 110 may, responsive to the query, transmit information that relates to respective intensities of the one or more lighting loads to the control circuit 210. If one or more lighting loads controlled by the dimmer switch 110 are not at respective lowest intensities, the control circuit 210 may, at 450, cause the wireless communication circuit 214 to transmit a command message to the dimmer switch 110 to lower the intensity of one or more lighting loads controlled by the dimmer switch 110. If the one or more lighting loads controlled by the dimmer switch 110 are at respective lowest intensities, the control circuit 210 may, at 452, cause the wireless communication circuit 214 to transmit a command message to the motorized window treatment 130 to lower the covering material (e.g., toward the closed position).

The control circuit 210 may then, at 444, wait for the predetermined period of time. Upon expiration of the period of time, the control circuit 210 may, returning to 434, cause the light detection circuit 216 to perform a measurement of the adjusted intensity of ambient light at the remote control device 200. The control circuit 210 may then compare the measured adjusted ambient light intensity $L_{MEAS}$ to the preset light intensity $L_{PRE}$. If, returning to 446, the measured ambient light intensity $L_{MEAS}$, is still greater than the preset light intensity $L_{PRE}$ plus the offset value ΔL (e.g., $L_{PRE}$ ΔL), the control circuit 210 may, returning to 448, determine whether the one or more lighting loads controlled by the dimmer switch 110 are at respective lowest intensities. If one or more lighting loads controlled by the dimmer switch 110 are not at respective lowest intensities, the control circuit 210 may, at 450, cause the wireless communication circuit 214 to transmit a command message to the dimmer switch 110 to lower the intensity of one or more lighting loads controlled by the dimmer switch 110. If the one or more lighting loads controlled by the dimmer switch 110 are at respective lowest intensities, the control circuit 210 may, at 452, cause the wireless communication circuit 214 to transmit a command message to the motorized window treatment 130 to lower the covering material (e.g., toward the closed position).

The control circuit 210 may then again wait for the predetermined period of time (returning to 444), cause the light detection circuit 216 to perform a measurement of the adjusted intensity of ambient light at the remote control device 200 (returning to 434), and compare the measured adjusted ambient light intensity $L_{MEAS}$ to the preset light intensity $L_{PRE}$. The control circuit 210 may repeat this pattern of measurement, comparison, adjustment, waiting, measurement, and so on, until the measured ambient light intensity $L_{MEAS}$ falls within the acceptable range of light intensity around the preset light intensity $L_{PRE}$. When $L_{MEAS}$ falls within the acceptable range of light intensity around the preset light intensity $L_{PRE}$ (e.g., when $L_{MEAS}$ is equal to $L_{PRE}$), such that the measured ambient light intensity agrees with the desired light intensity, the process 400 may terminate at 454.

The process 400 may be modified to be associated with a lighting preset for which artificial light is preferred over natural light. For example, the control circuit 210 may be alternatively configured to, at 438, determine whether one or more lighting loads controlled by the dimmer switch 110 are at respective highest intensities (e.g., are at full intensity). For example, the control circuit 210 may query the dimmer switch 110 for respective intensities of the one or more lighting loads, and the dimmer switch 110 may respond to the query by transmitting information that relates to respective intensities of the one or more lighting loads to the control circuit 210. If the one or more lighting loads controlled by the dimmer switch 110 are at respective highest intensities, the control circuit 210 may, at 440, cause the wireless communication circuit 214 to transmit a command message to the motorized window treatment 130 to raise the covering material 132 (e.g., toward the opened position). If the one or more lighting loads controlled by the dimmer switch 110 are not at respective highest intensities, the control circuit 210 may, at 442, cause the wireless communication circuit 214 to transmit a command message to the dimmer switch 110 to raise the intensity of one or more lighting loads. The control circuit 210 may further be alternatively configured to, at 446, determine whether the covering material 132 of the motorized window treatment 130 is positioned at a closed limit stop (e.g., in the closed position). If the covering material 132 of the motorized window treatment 130 is not at a closed limit stop, the control circuit 210 may, at 450, cause the wireless communication circuit 214 to transmit a command message to the motorized window treatment 130 to lower the covering material 132 (e.g., toward the closed position). If the covering material 132 of the motorized window treatment 130 is at a closed limit stop, the control circuit 210 may, at 452, cause the wireless communication circuit 214 to transmit a command message to the dimmer switch 110 to lower the intensity of one or more lighting loads controlled by the dimmer switch 110.

It should be appreciated that the example processes 300 and 400 are not limited to the illustrated operations, and that the example processes 300 and/or 400 may be modified, for instance by adding and/or omitting operations. To illustrate, the example process 300 may be modified to include a device location determination operation, such as the device location determination operation carried out at 430 in accordance with the example process 400.

The remote control device 200 may be configured to collaborate with one or more other components of an associated lighting control system in controlling the ambient light intensity in a space (e.g., at the remote control device 200). Referring again to FIG. 1, it should be appreciated that the lighting control system 100 is not limited to the illustrated components. For example, the lighting control system 100 may further include one or more (e.g., a plurality) of daylight sensors that may be positioned to detect whether the artificial light intensity or the natural light intensity is greater in a space. To illustrate, the lighting control system 100 may further include a first daylight sensor that is positioned (e.g., mounted) to measure the light intensity of the lighting load 114, and a second daylight sensor that is positioned (e.g., mounted) to measure the light intensity of natural light (e.g., daylight) entering the space. An associated remote control device 200 (e.g., one or both of the wireless communications device 150 and the remote control device 170) may be configured to determine which of the artificial light intensity or the natural light intensity is greater, for example by comparing the respective light intensities measured by the first and second daylight sensors.

The lighting control system 100 may include other types of load control devices, for example in addition to or in lieu of the dimmer switch 110 and/or the motorized window treatment 130. For example, the lighting control system 100 may further include one or more of, for example: a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The lighting control system 100 may include other types of input devices, for example in addition to or in lieu of the wireless communications device 150 and/or the remote control device 170. For example, the lighting control system 100 may further include, for example, one or more occupancy sensors, vacancy sensors, daylight sensors, radiometers, cloudy day sensors, temperature sensors, humidity sensors, pressure sensors, smoke detectors, carbon monoxide detectors, air-quality sensors, motion sensors, security sensors, proximity sensors, fixture sensors, partition sensors, keypads, battery powered remote controls, kinetic or solar-powered remote controls, key fobs, cell phones, smart phones, tablets, personal digital assistants, personal computers, laptops, timeclocks, audio-visual controls, safety devices, power monitoring devices (e.g., power meters, energy meters, utility submeters, utility rate meters, or the like), central control transmitters, residential, commercial, or industrial controllers, or any combination of these or other input devices.

The invention claimed is:

1. A remote control device for use with a lighting control device that is configured to control light intensity, the remote control device comprising:
 a user interface that is configured to receive an input that is indicative of a desired light intensity;
 a light detector that is configured to perform a measurement of an ambient light intensity at the remote control device in response to receipt of the input;
 a wireless communication circuit; and
 a control circuit that is configured to cause the wireless communication circuit to transmit a message to the lighting control device based on the measurement of the ambient light intensity and on a location of the remote control device, wherein the message causes the ambient light intensity at the remote control device to be adjusted towards the desired light intensity.

2. The remote control device of claim 1, wherein the control circuit is further configured to determine the location of the remote control device.

3. The remote control device of claim 2, further comprising:
 a locator circuit that is communicatively coupled to the control circuit,
 wherein the control circuit is further configured to determine the location of the remote control device via the locator circuit.

4. The remote control device of claim 3, wherein the locator circuit comprises a GPS receiver.

5. The remote control device of claim 2, wherein the control circuit is further configured to determine the location of the remote control device based on respective signal strengths of wireless signals received by the wireless communication circuit.

6. The remote control device of claim 2, wherein the light detector is further configured to receive a visible light communication message, and
 wherein the control circuit is further configured to determine the location of the remote control device based on the visible light communication message.

7. The remote control device of claim 2, wherein the control circuit is further configured to determine that the remote control device has been moved from the location to a second location, and to cause the wireless communication circuit to transmit a second message to a second lighting control device based on the second location and a measurement of a second ambient light intensity at the second location,
 wherein the second message causes the second ambient light intensity at the second location to be adjusted towards the desired light intensity.

8. The remote control device of claim 1, wherein the control circuit is further configured to cause the ambient light intensity at the remote control device to be adjusted such that the ambient light intensity at the remote control device agrees with the desired light intensity.

9. The remote control device of claim 8, wherein the control circuit is further configured to maintain agreement between the ambient light intensity at the remote control device and the desired light intensity.

10. The remote control device of claim 8, wherein the ambient light intensity at the remote control device agrees with the desired light intensity when a difference between the measured ambient light intensity and the desired light intensity falls within a difference threshold.

11. The remote control device of claim 1, wherein the control circuit is further configured to cause the wireless communication circuit to transmit the message to the lighting control device based on a proximity of the remote control device to a lighting source controlled by the lighting control device.

12. The remote control device of claim 1, wherein the message includes a command that causes the lighting control device to adjust the ambient light intensity at the remote control device by a specific amount of intensity that is based on the measurement of the ambient light intensity.

13. The remote control device of claim 1, wherein the message includes the measurement of the ambient light intensity.

14. The remote control device of claim 1, wherein the message includes a command that causes the lighting control device to adjust an intensity of a lighting load that is controlled by the lighting control device.

15. The remote control device of claim 1, wherein the message includes a command that causes the lighting control device to adjust an amount of natural light that arrives at the remote control device.

16. The remote control device of claim 1, wherein the control circuit is further configured to detect whether the light detector is obstructed, and if the control circuit detects that the light detector is obstructed, to cease causing adjustment of the ambient light intensity at the remote control device.

17. The remote control device of claim 1, wherein the remote control device comprises one of a mobile control device, a smart phone, a tablet device, a laptop, a wearable device, or a media device.

18. The remote control device of claim 1, wherein the remote control device comprises a dedicated remote control device that is configured to control the lighting control device.

19. A method of controlling light intensity, the method comprising:
receiving an input that is indicative of a desired light intensity;
determining a location of a remote control device;
measuring, by the remote control device, an ambient light intensity at the remote control device; and
if the measured ambient light intensity disagrees with the desired light intensity, transmitting to a first lighting control device, based on the determined location of the remote control device, a command to adjust the ambient light intensity at the remote control device towards the desired light intensity.

20. The method of claim 19, wherein the command causes the first lighting control device to adjust the ambient light intensity at the remote control device until at least one of:
the adjusted ambient light intensity agrees with the desired light intensity; or
an adjustment limit of the first lighting control device is reached.

21. The method of claim 20, further comprising:
if the adjustment limit of the first lighting control device is reached,
transmitting to a second lighting control device a second command to further adjust the ambient light intensity at the remote control device until at least one of:
the adjusted ambient light intensity agrees with the desired light intensity; or
an adjustment limit of the second lighting control device is reached.

22. The method of claim 19, further comprising:
determining that the remote control device has been moved from the location to a second location;
measuring, by the remote control device, a second ambient light intensity at the second location; and
if the measured second ambient light intensity disagrees with the desired light intensity, transmitting to a second lighting control device, based on the second location, a command to adjust the second ambient light intensity at the second location towards the desired light intensity.

23. The method of claim 19, wherein receiving the input that is indicative of the desired light intensity comprises receiving an indication of an actuation of a button of the remote control device.

24. The method of claim 19, wherein the remote control device is configured to determine the location of the remote control device.

25. The method of claim 19, wherein the command causes the first lighting control device to adjust the ambient light intensity at the remote control device until the ambient light intensity at the remote control device agrees with the desired light intensity.

26. A lighting control system, the system comprising:
a lighting control device that is configured to control an amount of light in a space; and
a remote control device having a light detector and a user interface that is configured to receive an input that is indicative of a desired light intensity for the space, the remote control device configured to, upon receipt of the input:
measure an ambient light intensity at the remote control device;
compare the measured ambient light intensity with the desired light intensity; and
if the measured ambient light intensity disagrees with the desired light intensity, and based on a location of the remote control device, cause the lighting control device to adjust the ambient light intensity at the remote control device towards the desired light intensity.

27. The lighting control system of claim 26, wherein the remote control device is further configured to, upon actuation, transmit a message to the lighting control device.

28. The lighting control system of claim 27, wherein the lighting control device is configured to adjust an intensity of a lighting load that is controlled by the lighting control device, and
wherein the message includes a command that causes the lighting control device to adjust the ambient light intensity at the remote control device by adjusting the intensity of the lighting load.

29. The lighting control system of claim 27, wherein the lighting control device is configured to control an amount of natural light that enters the space, and
wherein the message includes a command that causes the lighting control device to adjust the ambient light intensity at the remote control device by adjusting the amount of natural light that enters the space.

30. The lighting control system of claim 27, wherein the message includes an indication of the measured ambient light intensity.

31. The lighting control system of claim 27, wherein the message includes a command that causes the lighting control device to adjust the ambient light intensity at the remote control device until the ambient light intensity at the remote control device agrees with the desired light intensity.

32. The lighting control system of claim 26, further comprising:
a central controller,
wherein the remote control device is further configured to, upon receipt of the input, transmit a first message to the central controller, and
wherein the central controller is configured to transmit a second message to the lighting control device in response to receipt of the first message.

33. The lighting control system of claim 32, wherein the lighting control device is configured to adjust an intensity of a lighting load that is controlled by the lighting control device,
wherein the first message includes an indication of the measured ambient light intensity, and
wherein the second message includes a command that causes the lighting control device to the ambient light intensity at the remote control device by adjusting the intensity of the lighting load.

34. The lighting control system of claim 32, wherein the lighting control device is configured to control an amount of natural light that enters the space,
wherein the first message includes an indication of the measured ambient light intensity, and
wherein the second message includes a command that causes the lighting control device to adjust the ambient light intensity at the remote control device by adjusting the amount of natural light that enters the space.

35. The lighting control system of claim 26, wherein the remote control device is further configured to determine the location of the remote control device.

\* \* \* \* \*